(12) United States Patent
Krener-Iversen

(10) Patent No.: US 12,374,246 B2
(45) Date of Patent: *Jul. 29, 2025

(54) 3D DISPLAY

(71) Applicant: REALFICTION LAB APS, Copenhagen K (DK)

(72) Inventor: Steen Svendstorp Krener-Iversen, Copenhagen K (DK)

(73) Assignee: REALFICTION LAB APS, Copenhagen (DK)

( * ) Notice: Subject to any disclaimer, the term of this patent is extended or adjusted under 35 U.S.C. 154(b) by 0 days.

This patent is subject to a terminal disclaimer.

(21) Appl. No.: 18/026,971

(22) PCT Filed: Sep. 17, 2021

(86) PCT No.: PCT/EP2021/075689
§ 371 (c)(1),
(2) Date: Mar. 17, 2023

(87) PCT Pub. No.: WO2022/058541
PCT Pub. Date: Mar. 24, 2022

(65) Prior Publication Data
US 2023/0343255 A1    Oct. 26, 2023

(30) Foreign Application Priority Data

Sep. 17, 2020  (EP) .................................... 20196659
Jan. 21, 2021  (EP) .................................... 21152738
(Continued)

(51) Int. Cl.
G09G 3/3233    (2016.01)
G09G 3/00      (2006.01)
H04N 13/307    (2018.01)

(52) U.S. Cl.
CPC .......... *G09G 3/003* (2013.01); *G09G 3/3233* (2013.01); *G09G 2300/0413* (2013.01);
(Continued)

(58) Field of Classification Search
CPC ................. G09G 3/003; G09G 3/3233; G09G 2300/0413; G09G 2300/0452;
(Continued)

(56) References Cited

U.S. PATENT DOCUMENTS 5,982,342 A  * 11/1999 Iwata .................... H04N 13/305
                                                    348/E13.058
2007/0091037 A1* 4/2007 Lee ..................... G02B 27/0093
                                                    345/84
(Continued)

FOREIGN PATENT DOCUMENTS

WO    2015121067 A1    8/2015

OTHER PUBLICATIONS

Ji, Chao-Chao, Pixel extraction based integral imaging with controllable viewing direction; IOP Publishing, 5 pages; Online at stacks.iop.org/JOpt/14/095401, Sep. 4, 2012.

*Primary Examiner* — Chanh D Nguyen
*Assistant Examiner* — Nguyen H Truong
(74) *Attorney, Agent, or Firm* — Dinsmore & Shohl LLP

(57) ABSTRACT

A display for directional control of an image to an observer includes a plurality of pixels with a first pixel constituting an image pixel. The pixels are arranged in a plane and in a first segment covering a display segment area. Each pixel defines a pixel area having a plurality of subpixels, and the first pixel has a first plurality of subpixels including a first subpixel. Each subpixel pixel defines a direction from the display to a viewpoint, or an angle between the normal to said display and a viewpoint. A front optical arrangement has at least one optical element with an optical power and a first focal point (Continued)

at the plane, and a second focal point between the front optical arrangement and a point in front of and infinitely far away from the front optical arrangement. An electric circuit is implemented in a first thin film.

15 Claims, 19 Drawing Sheets

(30) Foreign Application Priority Data

Mar. 30, 2021 (EP) .................................... 21165969
Jun. 30, 2021 (EP) .................................... 21182832

(52) U.S. Cl.
CPC ............... *G09G 2300/0452* (2013.01); *G09G 2300/0465* (2013.01); *G09G 2300/0804* (2013.01); *G09G 2300/0814* (2013.01); *G09G 2320/028* (2013.01); *G09G 2320/068* (2013.01); *G09G 2354/00* (2013.01); *H04N 13/307* (2018.05)

(58) Field of Classification Search
CPC ... G09G 2300/0465; G09G 2300/0804; G09G 2300/0814; G09G 2320/028; G09G 2320/068; G09G 2354/00; G09G 2300/0443; G09G 2300/0857; G09G 2300/0842; G09G 2300/0861; G09G 2320/0261; G09G 3/32; G09G 3/00; G09G 3/10; G09G 3/12; G09G 3/20; G09G 3/30; G09G 3/34; G09G 3/36; G09G 3/3266; G09G 3/3291; G09G 5/00; G09G 5/02; H04N 13/307; H04N 13/383; G02B 30/27; G02B 27/0093; G06F 3/038
USPC ........................................................ 345/690
See application file for complete search history.

(56) References Cited

U.S. PATENT DOCUMENTS

| | | | |
|---|---|---|---|
| 2011/0096071 A1* | 4/2011 | Okamoto | H04N 13/305 345/419 |
| 2012/0249901 A1* | 10/2012 | Sekine | H04N 13/324 349/15 |
| 2013/0257925 A1* | 10/2013 | Kim | G09G 3/3677 345/204 |
| 2014/0146023 A1* | 5/2014 | Hamagishi | H04N 13/315 345/204 |
| 2015/0219912 A1* | 8/2015 | Kashiwagi | G02B 30/27 349/15 |
| 2016/0077394 A1* | 3/2016 | Nagasawa | G02F 1/133707 349/144 |
| 2016/0210892 A1* | 7/2016 | Ohara | G09G 3/2022 |
| 2017/0176818 A1 | 6/2017 | Shi et al. | |
| 2018/0247586 A1* | 8/2018 | Vahid Far | G09G 3/3216 |
| 2019/0206330 A1* | 7/2019 | Kim | G09G 3/3233 |
| 2020/0135092 A1* | 4/2020 | Ahmed | H10D 86/40 |
| 2020/0264486 A1* | 8/2020 | Kadono | G02F 1/15245 |
| 2021/0158740 A1* | 5/2021 | Yang | G09G 3/2003 |
| 2021/0241682 A1* | 8/2021 | Jung | G09G 3/3266 |

* cited by examiner

Red

Green

Blue

Red

Green

Blue

Red
Green
Blue

3D DISPLAY

CROSS-REFERENCE TO RELATED APPLICATIONS

This application is the U.S. National Stage of PCT/EP2021/075689 filed on Sep. 17, 2021, which claims priority to European Patent Application 20196659.5 filed on Sep. 17, 2020, European Patent Application 21152738.7 filed on Jan. 21, 2021, European Patent Application 21165969.3 filed on Mar. 30, 2021, European Patent Application 21182832.2 filed on Jun. 30, 2021, the entire content is incorporated herein by reference in their entirety.

FIELD OF THE INVENTION

The present invention is directed to a light field displays which can produce a synthetic light field which may deliver a stereoscopic reproduction of an object or a scene to one or more observers while simultaneously providing look-around capability, i.e. the experienced viewing angle and perspective changes in a way similar to that of a natural light field when an observer moves around the display, so it seems as if the scene or object was really there. A light field display is typically oriented horizontally so observers can walk around it an benefit fully from the look-around capability, although it can be positioned in many orientations.

Light field displays rely on the basic principle of directional pixels (sometimes referred to as hogels). A directional pixel is capable of emitting light rays of different intensity and color in different angles. It typically comprises a micro lens and an array of very small sub-pixels. The lens focuses light of individual sub-pixels in corresponding emission directions. A light field display is typically constructed as a very high resolution display with an overlaid micro lens array.

BACKGROUND OF THE INVENTION

A traditional light field display emits light in a plurality of angles from each pixel, regardless of whether an observing eyeball is positioned in a direction of any of the angles or not. In practice, usually only a very small fraction of emitted light rays are received by an eyeball. Such unobserved light rays are of no merit, yet they account for the vast amount of complexity in subpixel circuits and image rendering hardware.

A light field display may be operated in a mode where a separate system tracks ob-server head positions and renders only the views that are emitted towards eyeballs of the observers, i.e. views that are not observed are not rendered or transmitted to the display. Such a configuration has been referred to as an automultiscopic display. This may simplify the image generating means which is providing still or moving images to the display, but it does not necessarily reduce the complexity of the display itself, since it still has to provide the capability of emitting light rays of required intensity and potentially color in any direction where an eyeball can potentially be positioned.

An autostereoscopic display with head tracking may have a significantly lower com-plexity while keeping a high resolution to a single observer located in a restricted viewing zone. This can be useful for some applications, but excludes use in a number of situations such as for example social events, group presentations and professionals working together.

A high angular resolution of a light field display, i.e. the number of discrete "views" (sol-id angle intervals of essentially homogenous irradiance from a pixel), is desirable be-cause it may reduce the difference in perspective per view and hence distracting abrupt changes when a pupil of an observer moves from a view to a neighboring view. Further, it may reduce perceived blurring of objects when an observer's pupil is located at a boundary between views, so that light from both views enter the pupil. Further a high angular resolution increases the distance from which a stereoscopic effect can be observed and/or the field of view of the display.

A problem is that angular resolution comes at the cost of extreme complexity and the complexity scales with the square of the angular resolution. Consider a display that must be able to be observed from 5 meters distance and pixels should have a field of view of 90 degrees. Assuming the observer has a minimum eye distance of 55 mm, the angular resolution of the display must be $2 \times \tan{-1}((55 \text{ mm}/2)/5000 \text{ mm degrees}) = 0.63$ degrees to make sure each eye can see a different view. With perfect optics this will require a minimum of 143 views in a horizontal direction and 143 views in a vertical direction totaling a minimum theoretical number of $143^2 = 20,449$ views, corresponding to 20.449 sub-pixels per pixels. And this is for a monochrome display, a color display with a sub-pixel for each of the primary colors per pixel would require three times that number, i.e. 61.347 sub-pixels per pixel. For a full HD display this corresponds to $1920 \times 1080 \times 61.347 =$ more than 127 billion subpixels. For comparison the highest resolution displays commercially available today, 8K displays, have about 100 million sub-pixels, more than thousand times less.

One approach to achieving extremely high resolutions is to tile multiple high resolution microdisplays. Since each microdisplay needs a high bandwidth connector this requires in practice that microdisplays are located with a small distance, resulting in dark gaps between microdisplay. An optical construction, for example a relay optics construction, located on top of the microdisplays may to some extent reduce visibility of dark gaps, but in practice such displays are not completely seamless, and the relay optics is complex and prohibits a thin form factor of the display.

Alternatively, subpixels may be selected using infrared light while all subpixels in a pixel receives the same electrical signal for controlling the pixel color value. For example subpixels may be sensitive to infrared light, such that they are enabled only when illuminated by infrared light, and infrared light may be focused onto the subpixel by an optical illumination system controlled by a control system connected to an eye tracking system. Such a configuration may include an infrared upconversion layer in an organic stack comprising an OLED layer. Such a configuration may significantly reduce complexity of the electric circuits but comes at a cost of including an infrared illumination and focusing system capable of focusing infrared light on each subpixel and optical tolerances and diffraction phenomena may limit how small subpixels can be addressed, hence limiting the resulting resolution.

SUMMARY OF THE INVENTION

The above-described shortcomings of existing technology mean that even the best light field displays and automultiscopic displays available today need to compromise significantly on resolution, viewing distance, field of view, color reproduction, viewing zone and/or number of observers while still exhibiting distracting artifacts such as abrupt changes between discrete views when moving around while observing the display and/or blurred borders in observation positions on view boundaries. In spite of this, the natural depth perception and the look-around capabilities are for certain use cases so important factors, that there is in fact a market for light field and automultiscopic displays for certain applications, despite these quality re-strictions. For a wider market acceptance, there is a need for a significant improvement in the performance parameters though.

The display according to the present disclosure has the ability to display an image in a specific angle/direction or narrow range of angles such that the image being visible by a left eye of an observer and not the right eye of the observer for example. In this way the display may display an image in a first time slot or time window in an angle such that the image is visible to the left eye of the observer, and display an image in a second time slot in an angle such that the image is visible to the right eye of the observer. The two images may be such that the observer perceives a three dimensional image. Such a display has an autostereoscopic ability such that the observer does not need to use glasses. Such a display can also be used for energy savings for example by only illuminating the room in an angle towards the observer. Such a display can also be sued to display individual information to observers of the display.

In order to emit light in different angels depending on the position of the observer, each image pixel is divided into a number of subpixels, and the light of the subpixels is di-rected into different angles/directions by a lens in front of the pixel plane. For each im-age pixel, the subpixel having the position within the image pixel that means that it is visible by the observer from the observer viewpoint is selected to emit light. In this way, a ray from one subpixel is traced from the subpixel to the lens where it is refracted and continues from the lens to the observer. A ray from another subpixel having a different position within its image pixel compared to the position of the first subpixel is traced from the subpixel to the lens where it is refracted and continues from the lens to the observer.

Pixels in the display may be grouped into groups of pixels forming a segment of the display. Pixels in a segment may emit light in essentially identical angles. Hence subpixel selection for all pixels in the segment may be identical. This has an advantage of further reducing complexity, because a single common subpixel selection signal can be provided to the whole segment as opposed to a plurality of subpixel selection signals, one for each subpixel. The size of a segment may be selected knowing the beam diversion of emitted light rays, so that for any first point within a desired eyebox of the display, beams emitted in essentially identical angles from essentially all pixels in the segment can be directed to illuminate this first point and at the same time not illuminate a second point located more the a a typical interocular distance away from the first point.

The subpixel size and refracting lens may for example be selected so beams have a beam diversion of 0.5 degrees. The segment size may be for example 6×6 mm. The number of pixels in a segment may for example be 64 pixels arranged in a grid of 8×8 pixels. Each pixel may have a red, a green and a blue color subpixel. Each color subpixel may comprise a number of directional subpixels, for example 1200 directional subpixels arranged in a grid of 100 horizontally and 12 vertically.

The display may be made up of a plurality of such segments which may have identical size and number and arrangement of pixels. Segments may for example be quadratic or rectangular.

Not having such segments would mean that more data processing and data transmis-sion would be required.

All image pixels within a first segment emits light in a first angle, and all image pixels within a second segment emits light in a second angle different than the first.

Thus, each segment receives a data signal for addressing the same subpixel in each of the image pixels of that segment instead of having to render an image having information about light intensity of each subpixel in all image pixels of the display.

This reduces the requirements for data processing and data transmission and the amount of transistors needed in the display circuit, i.e. if each subpixel in a nonsegmented display has two transistors, the number of transistors can be halved by collecting every other image pixel in segments.

The above object and advantages together with numerous other objects and advantages, which will be evident from the description of the present invention, are according to a first aspect of the present invention obtained by:

A display for displaying an image to an observer at a first viewpoint, said display comprising:
  a plurality of pixels constituting image pixels, each image pixel comprising a group of subpixels and displaying a sample of said image during intended operation of said display,
  an electric circuit including a plurality of pixel circuits, each pixel circuit arranged for driving said group of subpixels of each image pixel,
  said electric circuit comprising a plurality of control circuits for addressing a respective subpixel of said group of subpixels,
  each control circuit having a memory component, an address signal input, and a selection input,
  said control circuit arranged such that said address signal being input into said memory component when said control circuit being selected by said selection input.

According to a second aspect of the present invention the above objects and advantages are obtained by:

A display for displaying an image to an observer at a first viewpoint, said display comprising:
  a plurality of pixels constituting image pixels, each image pixel comprising a group of subpixels and displaying a sample of said image during intended operation of said display,
  each group of subpixels having a first number of subpixels positioned substantially horizontally such as a row of subpixels, and a second number of subpixels positioned substantially vertically such as a column of subpixels,
  an electric circuit including a plurality of pixel circuits, each pixel circuit arranged for driving said group of subpixels of each image pixel,
  a control system for outputting address signals for addressing a respective subpixel of each pixel circuit, and a set of brightness values, said set of brightness values comprising a brightness value for each pixel circuit,
  said electric circuit connected to said control system by means of a number of electrode lines,
  said number of electrode lines being smaller than the sum of said first number of subpixels and said second number of subpixels.

According to a third aspect of the present invention the above objects and advantages are obtained by:

A display for displaying an image to an observer at a first viewpoint, said display comprising:

a plurality of pixels constituting image pixels, each image pixel comprising a group of subpixels and displaying a sample of said image during intended operation of said display, an electric circuit including a plurality of pixel circuits, each pixel circuit arranged for driving said plurality of subpixels of each image pixel, said plurality of pixel circuits including:

a first pixel circuit having a first pixel driver for driving a first group of subpixels including a first subpixel, and a second pixel circuit with a second pixel driver for driving a second group of subpixels including a second subpixel, said first subpixel connected through a first switch to said first pixel driver for driving said first subpixel such that said first subpixel outputting light having a first brightness, and said second subpixel connected through a second switch to said second pixel driver for driving said second subpixel such that said second subpixel outputting light having a second brightness, said first switch having a first input for switching said first switch, and said second switch having a second input for switching said second switch, said electric circuit comprising a control circuit for switching said first switch and said second switch by means of a control signal output by said control circuit at an output, said output connected to said first input and said second input.

BRIEF DESCRIPTION OF THE DRAWINGS

FIG. 4b shows a front view/schematic of a display having fewer pixels as well as fewer subpixels than the display illustrated in FIG. 4a;

DETAILED DESCRIPTION OF THE INVENTION

Figure 1:
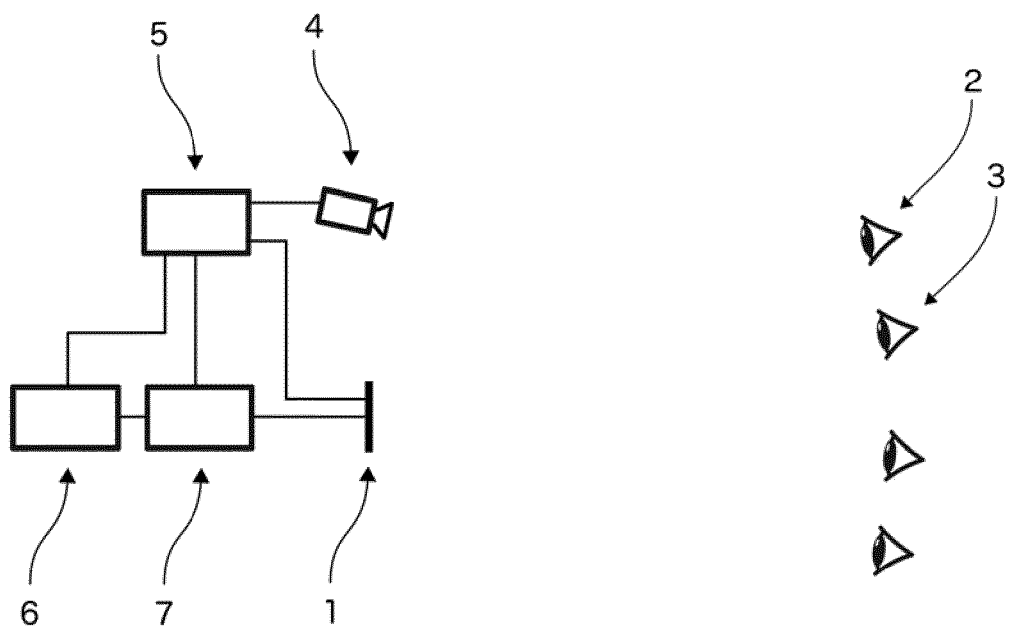
FIG. 1 shows a schematic illustration of a display system.

The invention will now be explained in more detail below by means of examples with reference to the accompanying drawings. The invention may, however, be embodied in different forms than depicted below, and should not be construed as limited to any examples set forth herein. Rather, any examples are provided so that the disclosure will be thorough and complete, and will fully convey the scope of the invention to those skilled in the art. Like reference numerals refer to like elements throughout. Like elements will, thus, not be described in detail with respect to the description of each figure.

FIG. 1 shows a schematic illustration of a display system.

A display 1 is observed by a first observer (having a first eye 2 and a second eye 3—left and right eye), and viewing the display from a first viewpoint.

The display is arranged to display an image to the observer.

A tracking system 4 (such as an eye tracking system) may determine the position of the first eye 2.

The tracking system may also determine the position of the second eye, either by measuring or inferring it as a function of the position of the first eye and an average interocular distance.

In general, the tracking system may track any number of observers being in front of the display.

The position may be input to a control system 5 for controlling that the display displays an image that may be observed by the first observer at the first viewpoint, i.e. output light in a direction towards the first observer.

At other viewpoints than the first viewpoint, the display may be arranged to appear as being dark, i.e. the image, which is displayed is directed only to the observer (or only to the first eye of the observer).

A first image may be displayed to the left eye and a second image may be displayed to the right eye (for example in two different time slots). When the two images have a slightly offset perspective, a 3D effect may be perceived by the observer. The display may be operated in a time multiplexed operation having at least two time slots.

The display may be autostereoscopic (i.e. multi-view autostereoscopic 3D display) so that there is no need for any headgear.

The display may also display the same image to both eyes, which may achieve a power saving, but no 3D effect. Hence the display may also be able to display 2D images.

The controller 5 may be arranged to control an image generator 6, which may be arranged to output an image (image data) to a display driver circuit 7, which may be arranged for driving the display 1 in order to display the image.

In a first time slot the controller may direct the image generator 6 to output a first image intended for the first eye 2, for example a perspective view corresponding to the position of the first eye 2, and in a second time slot the controller may direct the image generator 6 to output a second image intended for the second eye 3, for example a perspective view corresponding to the position of the second eye 3.

The image generator 6 may comprise an image render system capable of calculating a perspective view of a representation of a 3D object or a 3D scene. Hence an observer possessing the first eye 2 and the second eye 3 may be capable of moving around and observing an object or a scene from different perspective.

Alternatively or additionally, the image generator 6 may comprise a playback system, which may be capable of in the first time slot outputting a first perspective view image of a stereoscopic image and in the second time slot outputting a second perspective view image of a stereoscopic image. The stereoscopic image may be an image in an image sequence in a film or transmission.

The frequency of the time multiplexed operation may be selected so a human visual system is essentially not capable of noticing the multiplexing, for example the multiplexing may comprise 60 or more full duty cycles per second, for example 72 duty cycles per second, hence the first eye 2 may perceive the first image as being essentially steady and without flicker and the second eye 3 may perceive the second image as being essentially steady and without flicker. Hence an observer possessing the first eye 2 and the second 3 may perceive an essentially flicker free stereoscopic image.

In a multi-viewer autostereoscopic mode, the eye tracking system may be capable of detecting more than two eye positions and the controller 5 may be capable of directing the display to emit light in directions so an image displayed on the display may be visible by more than one eye in a time slot. Hence, for example a set of left eyes belonging to a set of observers may see the first image and a set of right eyes belonging to the set of observers may see the second image. Hence a set of observers may perceive a stereoscopic image simultaneously.

An advantage of the disclosed invention is that the display may be capable of switching fast between emitting light in different directions synchronized with displaying corresponding images. Hence it may be able to have a high multiplexing frequency, allowing for more than two time slots in a duty cycle while at the same time avoiding perceived flicker.

Hence, as opposed to prior art systems, in an automultiscopic mode, more than one observer may be able to perceive individual perspective views dependent on observer position. For example, the display may be capable of operating in a duty cycle 60 times per second where each duty cycle comprises 10 time slots, hence enabling individual perspective views to ten eyes, hence for example delivering individual stereoscopic perspective images to 5 observers simultaneously, where prior art is generally limited to one stereoscopic perspective.

This fast operation and multi observer advantage are achieved using an active matrix display configuration comprising memory components in the active matrix display backplane storing data for subpixel switching control and where multiplexed data for subpixel switching/selection/addressing control are transmitted by transmission lines in the backplane and are demultiplexed by circuits in the backplane synchronously with demultiplexing of pixel color values, which greatly reduces the required bandwidth of electric circuits in the active matrix backplane and hence enables a very fast responding display configuration and further enables good synchronization between update of pixels with respect to pixel color and direction of emitted light, as shall be taught below as shall be taught below.

Figure 2A:
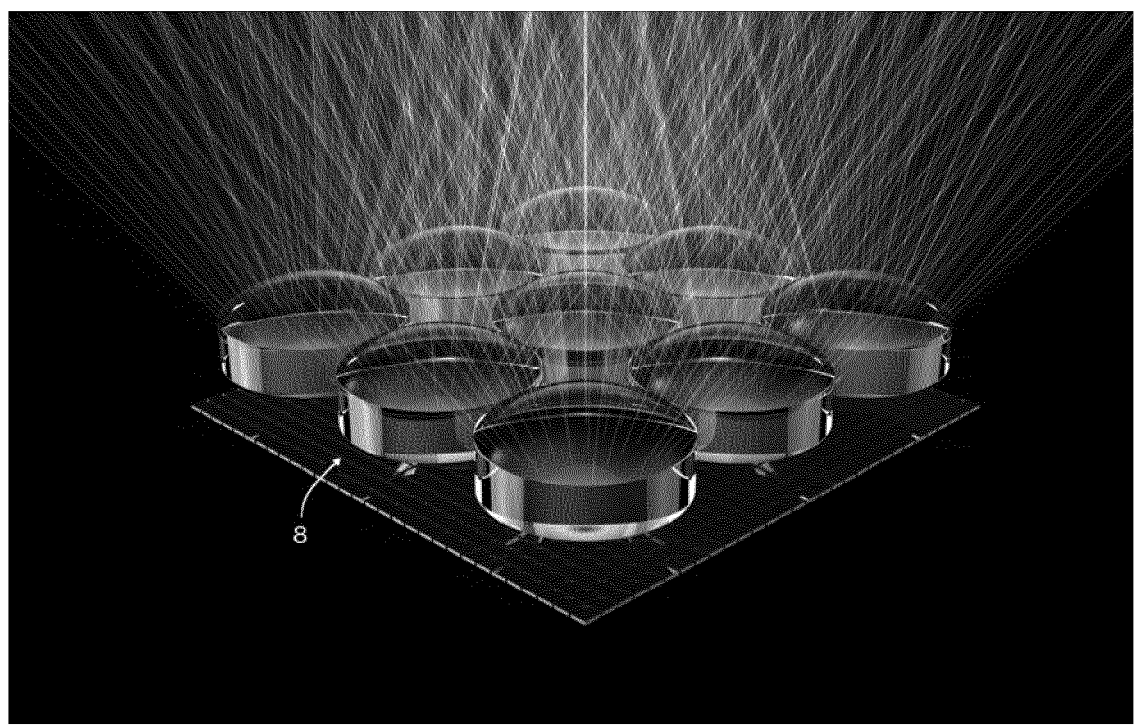
FIG. 2a illustrates a light ray tracing of light output from a segment of the display arranged to display 9 image pixels, i.e. an image made up of 9 pixels.

FIG. 2*a* illustrates a light ray tracing of light output from a segment of the display arranged to display 9 image pixels, i.e. an image made up of 9 pixels.

A segment has a size which may be smaller than an interocular distance, particular the horizontal width of a segment may be smaller than a typical interocular distance—otherwise an image displayed to the left eye may be observed by the right eye or vice versa. A segment may for example be 6×6 mm.

The display has a front optical arrangement such as a microlens array 8, i.e. a lens in front of each element arranged to output the light constituting one of the image pixels.

The element outputting the light constituting one of the image pixels could be an OLED or LCD element. It may be referred to as a pixel, but it is made up of several individually addressable pixels (or "subpixels", which each individually addressable pixel will be referred to in the following), i.e. the light constituting one image pixel will be output by one of the subpixels in a group of subpixels—one of the individually addressable subpixels in the group of subpixels will be a addressed/selected to output light.

Thus, the segment of the display is arranged as having 9 groups of subpixels, each group having for example 100 subpixels. The subpixels may be distributed/layout as a subpixel grid/subpixel matrix.

The display may be made up of a plurality of segments, each segment having a plurality of groups of subpixels (each group constituting a pixel), and each group (pixel) may have a plurality of subpixels.

The front optical arrangement has at least one optical element with an optical power and a first focal point substantially at the plane or layer, which outputs light, and a second focal point between the front optical arrangement and a point in front of and infinitely far away from the front optical arrangement. It may be located at the side facing the observer (in front of the light output layer—between the light output layer and the observer).

Figure 2B:
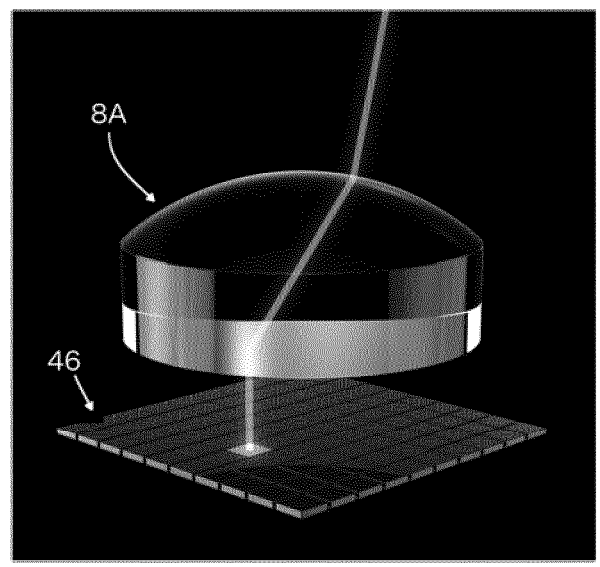
FIG. 2b shows a close up of the light ray tracing illustration of FIG. 2, i.e. zoomed in on a single element outputting the light constituting one of the image pixels during a first timeslot.

FIG. 2*b* shows a close up of the light ray tracing illustration of FIG. 2, i.e. zoomed in on a single element outputting the light constituting one of the image pixels during a first timeslot.

A first front microlens 8A, comprised in the microlens array 8, may be located between the observer and a set/group of subpixels 46.

A first sub-pixel in the set/group of sub-pixels 46 may output light and light from the first subpixel may be refracted by the microlens 8A in a first light emission angle/direction so the first pixel has a light emission direction essentially towards the first eye 2 of the observer.

100 subpixels are illustrated meaning that light may be output towards 100 different viewpoints, i.e. depending on which of the 100 viewpoints the observer is observing from, that particular subpixel may be addressed to output light.

Figure 2C:
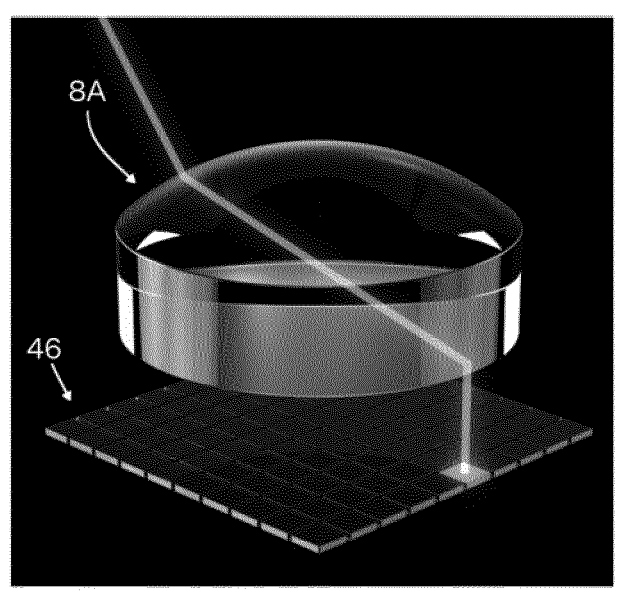
FIG. 2c shows a close up of the light ray tracing illustration of FIG. 2, i.e. zoomed in on a single element outputting the light constituting one of the image pixels during a second timeslot.

FIG. 2*c* shows a close up of the light ray tracing illustration of FIG. 2, i.e. zoomed in on a single element outputting the light constituting one of the image pixels during a second timeslot.

A second subpixel in the set/group of subpixels 46 may be addressed to output light and that light may be refracted by the first front microlens 8A.

Since the second subpixel has a different position than the first subpixel within the area defined by the element outputting the light constituting one of the image pixels, the light will be refracted in a second light emission angle/direction so the first "pixel" has a light emission direction essentially towards a second viewpoint, for example the second eye 3 of the observer.

Figure 3:
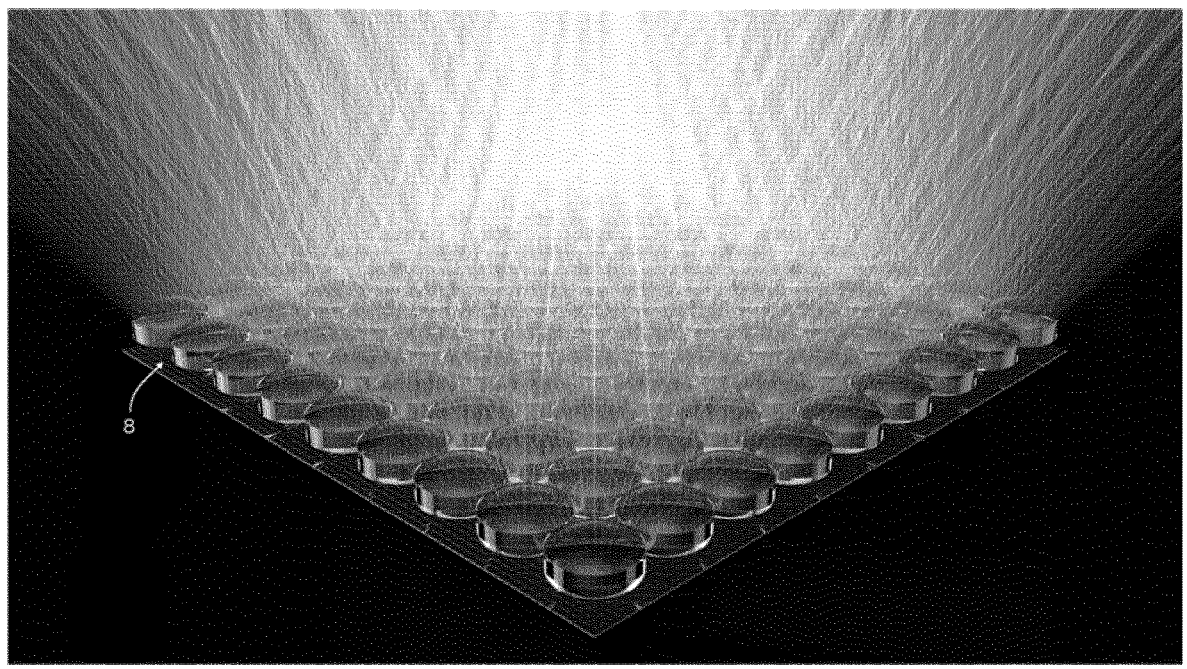
FIG. 3 illustrates a light ray tracing of light output from a display arranged to display 81 image pixels, i.e. displaying an image, which is a raster graphic/bitmap image made up of 81 image elements/image pixels.

FIG. 3 illustrates a light ray tracing of light output from a display arranged to display 81 image pixels, i.e. displaying an image, which is a raster graphic/bitmap image made up of 81 image elements/image pixels.

The display is illustrated having 9 segments with 9 groups of subpixels in each segment. Each group (or pixel) has 100 subpixels. In total there is 8100 subpixels. The display may be a dot matrix display.

In a practical implementation the display may have many more pixels, for example approximately 2 million pixels arranged in segments of 64 pixels, but for clarity of the drawings we will describe this configuration with 81 pixels.

Figure 4A:
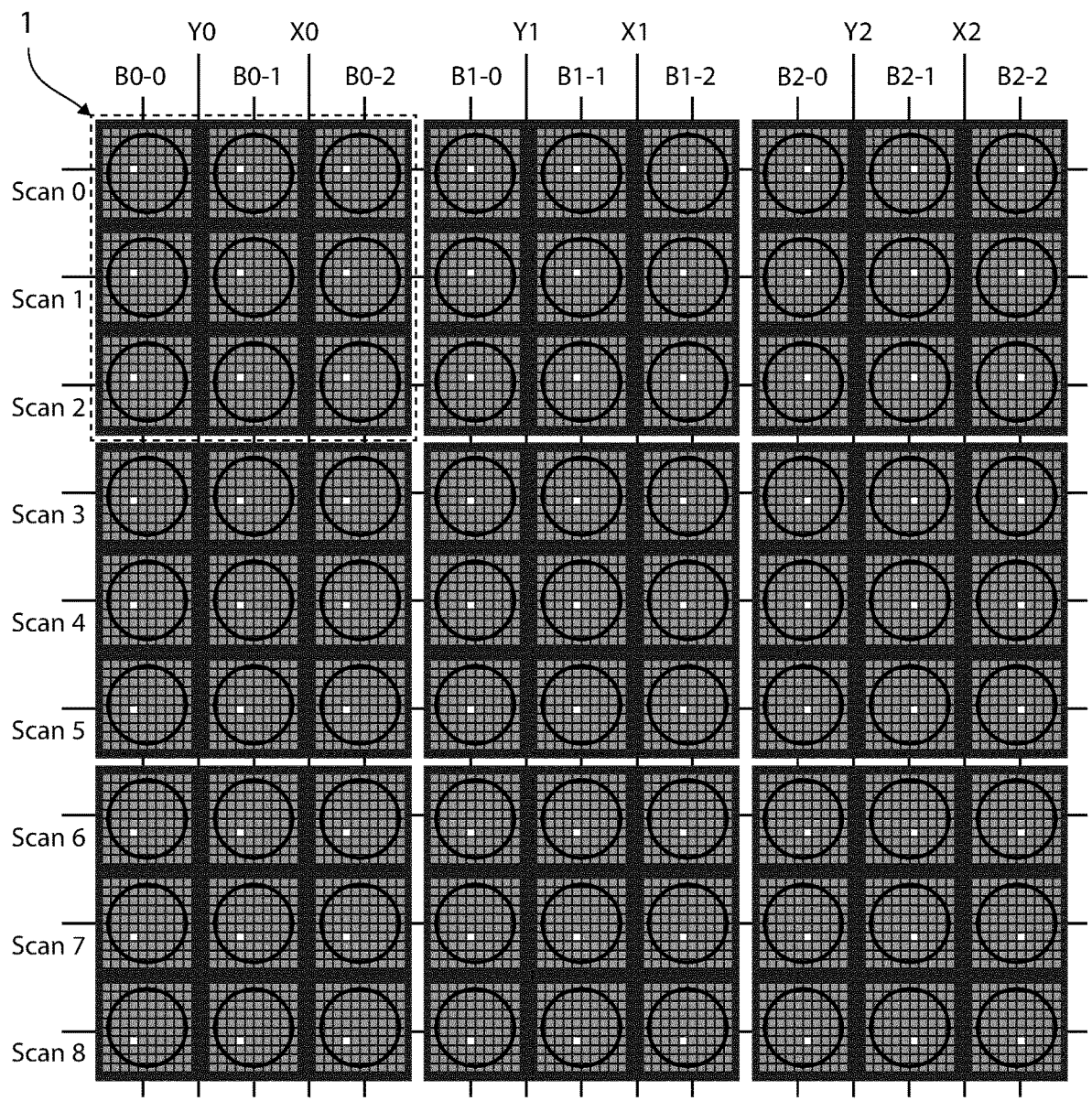
FIG. 4a shows a front view/schematic of the 81 pixel display described in connection with FIG. 3.

FIG. 4a shows a front view/schematic of the 81 pixel display described in connection with FIG. 3.

Each subpixel is illustrated as a gray square, and the respective subpixel outputting light from each group of subpixels is illustrated as a white square.

Each lens in front of each pixel (group of subpixels) is illustrated as a black circle.

The 9 groups of subpixels in a first segment 1 are illustrated by the square with the striped outline, i.e. the first segment is the segment in the top left corner.

Each group of subpixels is illustrated as making up a rectangular area, and is illustrated as having a distance to the neighboring group of subpixels.

The subpixels that outputs lights from the groups of subpixels in a segment are arranged/positioned having the same relative position within a group.

A plurality/number of the subpixels in a group of subpixels may be positioned such that there will be a plurality of viewpoints distributed substantially horizontally, i.e. a horizontal resolution of viewpoints. Such plurality of subpixels may be a row of subpixels, i.e. substantially horizontally arranged/positioned subpixels. A group of subpixels may have more rows of subpixels than columns of subpixels (a column being vertically arranged/positioned subpixels.

The subpixels for a group of subpixels may be arranged/positioned in a 2 dimensional space, i.e. the position of a subpixel within a group of subpixels may be characterized by a pair of coordinates (a first coordinate X, and a second coordinate Y).

A cartesian coordinate system may be used, i.e. the X coordinate designate the position of a subpixel horizontally within a group of subpixels (1-10 in the present illustration), and the Y coordinate designate the subpixel vertically within a group of subpixels (1-10 in the present illustration). The origin may be the top left corner ($1^{st}$ row, $1^{st}$ column), i.e. subpixel (1,1) is the top left subpixel, and subpixel (10,10) is the bottom right subpixel (last row, last column).

For a segment (i.e. within a segment) all of the light outputting subpixels (one for each group for example) has the same relative position within all of the groups of subpixels, i.e. the subpixel outputting light in the first group of subpixels (top, left group of subpixels) may have the same pair of coordinates as the subpixel outputting light in the group of subpixels to the right of the first group of subpixels.

Or said in another way, each group of subpixels within a segment takes up an area (the subpixels in a group of subpixels has a physical distribution over an area). The subpixels outputting light may have substantially the same positions within each area, i.e. the subpixel outputting light in the first group of subpixels (top, left group) has a first position within the area of the first group of subpixels. The subpixel outputting light in the group of subpixels (top, second to the left group) to the right of the first group of subpixels has a second position within the area of that second group of subpixels. To come from the first position to the second position a (linear) translation of the first position is performed.

In this way, the addressing of subpixels is much simpler than in the prior art where subpixels are addressed in the same way as individual pixels are addressed in an active matrix driving scheme.

The simpler addressing means that the number of transistors may be reduced and/or the number of data lines may be reduced. For example, individual pixel values do not need to be transmitted to each subpixel and only one pair of coordinates is to be determined per segment.

More than one subpixel may output light from a group of subpixels, for example the relevant subpixel for a measured/detected viewpoint may be determined, and the subpixels around that subpixels may also be addressed to output light.

There may be subpixels in a group of subpixels not used for anything.

The display may have a set (number) of data lines for transmitting brightness or grayscale values/signals—each group of subpixels is to receive a brightness value (one or more of the subpixels will then output light at a brightness corresponding to the received brightness value, i.e. represented by a current or voltage).

In the segment of FIG. 4a, the data lines constitute electrode lines arranged as column lines (B0-0 to B2-2).

The display may have a number of scan lines for scanning the brightness values into each group of subpixels, i.e. the display is preferably an active matrix display such that the scanned brightness values will be held/stored for each group of subpixels such that each subpixel will output light corresponding to the scanned brightness value as long as that brightness value is being stored.

In the segment of FIG. 4a, the scan lines constitute electrode lines arranged as row lines (Scan 0 to Scan 8).

For clarity of the description the display is described as having this basic active matrix configuration for a gray scale display, however, the scope of the invention should be considered to include modifications and additions well known in the art such as an RGB color mask to enable the display to display color images and circuits and other means for enhancement, calibration and compensation for brightness variations over time and in different parts of the display surface for example due to manufacturing tolerances, including but not limited to pre-charge lines, reset lines and lookup tables.

A row driver (not shown) (sometimes also referred to as a gate driver) may be comprised and may be connected to the scan/row lines.

The row driver may scan the display by sequentially outputting an active row control signal starting from scan line 0 ending at scan line 8 in a scan operation where one scan line at a time is active. This scan operation may be repeated while the display is active.

A column driver (not shown) (sometimes also referred to as a source driver) may be comprised and may be connected to the data/column lines.

The column driver may output column control signals which may be analog brightness values on the column lines synchronized with the row driver and update the display with a new image during a scan operation.

A pixel (pixel circuit for each group of subpixels) in the display may comprise sample-and-hold circuits (storage circuit) and may perform a sample-and-hold operation of the column control signals when corresponding row control signals are active.

A segment (group of pixels) may have a number of address lines for transmitting address signals such as one, two or for example 15, address lines for each segment. The (maximum) number of subpixels in a group of subpixels may be the number of scanlines to the power of number of address lines, i.e. 1 address line and 9 scan lines means that (up to) 9 subpixels may be address in a group of subpixels. 2 address lines and 4 scan lines means that 16 subpixels may be addressed.

Six address lines (X0, Y0, X1, Y1, X2 and Y2) are illustrated in FIG. 4a. Segment 1 has two address lines, X0 and Y0.

The address lines may transmit an address control signal for addressing subpixels. For example X0 and Y0 may transmit a subpixel address control signal for the first segment (group of pixels) in the display segment 1.

The subpixel address control signal may define a position relative to the first front microlens 8A of the first subpixel in the set of sub-pixels 46 hence defining the first light emission angle of the first pixel.

An advantage of this is, that direction data (emission angle data/sub pixel addressing data) can be transmitted as multiplexed data and stored in the display for example using circuits similar to active matrix circuits used for pixel value control.

Other pixels (groups of subpixels) in the display segment 1 may be configured so they have subpixels which are addressed essentially identically to the first subpixel and hence they may emit light in essentially identical emission angles (directions towards viewpoints). Hence essentially all front microlenses in the display segment 1 may emit light in a same light emission angle defined by X0 and Y0. The light emissive area of a subpixel may have an area >0, i.e. not being a perfect mathematical point. Hence a light beam emitted from a microlens may have a beam divergence >0, i.e. the light beam is not perfectly collimated. Hence light emitted from essentially all front microlenses in the display segment 1 may reach an eyeball even if the emission angle is the same for all microlenses in segment 1, provided the beam divergence, segment size and eyeball distance range are calculated (using well known geometrical algebra) so the beam divergence is not too small, the segment size is not too big and the distance from the display to the eyeball is not too small. For example the beam divergence may be approximately 0.5 degrees, the segment size may be approximately 6×6 mm and the distance to the eyeball may be between 0.3 and 3 meter. Hence an eyeball can observe all microlenses in a segment as illuminated, even though the microlenses are located in different positions and all emit light in the same angle.

In other words, the address control signals X0 and Y0 may control a common light emission angle for the display segment 1 and the column control signals B0-0 to B0-2 may control a brightness level for each pixel in the display segment 1. Other display segments in the display may emit light in different angles, so that for example the display can have a first emission angle from a top right corner of the display towards the first eye 2 and a second emission angle from a bottom left corner of the display towards the first eye 2 where the first and second angle are different.

The address electrode lines may be connected to outputs of the column driver. Outputs of the column driver connected to address electrode lines may be operated as binary signals, for example they may be analog outputs operated so they are essentially always at either a high voltage level or at a low voltage level.

The column driver may comprise a digital-to-analog converter and the digital input values to the digital-to-analog converter corresponding to an output connected to an address electrode line may be selected so it is essentially always a high digital value or a low digital value. The digital values may for example be stored in a video frame buffer which may also store digital pixel brightness values for the column control signals.

In other words, subpixel address control signals defining light emission angles for display segments may be comprised in the same video frame buffer as pixel values. An advantage of this configuration is, that existing standard active matrix external circuitry, (row drivers, column drivers, timing controller, video frame buffer and video input interfaces) can be used for transmitting direction data (emission angle data/subpixel addressing data) to the display.

If for example segments are 100×100 pixels and each have 2 address electrode lines, standard active matrix external components can be used with only 2 out of 100 column lines being used for sub-pixel address data, and 98% of the horizontal and 100% of the vertical resolution can be maintained while supporting an angular resolution of 100× 100=10,000 different light emission angles per display segment.

In summary the operation may also be described as the following: when the row driver has scanned the row electrode lines Scan 0-Scan 2, the display segment 1 is fully updated and has stored 6 binary sub-pixel address addressing control signals (3 for X addressing and 3 for Y addressing) and 9 pixel brightness values.

The 9 pixel brightness values control via traditional pixel drivers the brightness of illuminated subpixels in the respective pixels and the 6 binary subpixel address control signal values control for example via switching transistors which subpixels are illuminated (output light).

The 6 binary sub-pixel addressing control signal values may be divided into 3 X-position values controlling which subpixel column positions are active and 3 Y-position values controlling which rows of sub-pixel positions are active. Subpixels in positions where both the column position is active and the row position is active are illuminated.

In an update interval during which the display segment 1 is being updated, i.e. in interval in which any of the row electrode lines Scan 0-Scan 2 are active, the display segment 1 may hold an undesired combination of updated and non-updated sub-pixel address control signal values. Hence, in an update interval, the display segment 1 may emit light in undesired directions. It may be assumed that the update interval is short relative to a duration of a frame displayed on the display and that the risk of light which is emitted in undesired directions will reach an eye of an observer is very small. Hence it may be assumed that the update interval is perceived as a dark interval which is too short for an eye to notice. For example, if a segment is 6 mm high and the active display surface is 800 mm high, then a segment height is 0.75% of the display height and the segment update time will be essentially 0.75% of the display update time. In addition, the segment will emit light in different directions during the update, so in the unlikely worst case situation of a video frame, where light from a segment is received by another eyeball than the desired eyeball, this will only be in a very short interval, significantly shorter than 1% of the update cycle, hence will maximum generate undesired crosstalk of significantly less than 1% of the pixel values in the segment during the video frame. In other words, it may be decided to do nothing about the potential unwanted emission directions during an update interval and accept the small risk of small undesired noticeable effects.

Alternatively, an additional circuit may be comprised, capable of switching off sub-pixels during an update interval. The additional circuit may for example switch off a common voltage supply to all pixel driver circuits when Scan 0 goes from an inactive state to an active state and switch on the common voltage supply again when Scan 2 goes from an active state to an inactive state. Design of such a circuit can be done using well known circuit design techniques and may for example comprise an SR flip-flop.

A pixel in the display segment 1 may store address control signals in a similar manner to the storing of column control signals, for example by sample-and-hold operations controlled by the row control signals. Alternatively other means of storage known in the art of electronics may be comprised, for example data latches or other flip flop circuits. Alternatively, for controlling the storage function by the row control signals other means known in the art of electronics may be comprised, for example a clock signal may be comprised and the address control signals may be serial data.

The size of subpixels in the display segment 1 may be calculated and selected so light from the front microlenses is emitted in beams having a divergent shape, for example cones, where the cones may have a divergence so the first eye 2 is located inside of the essentially all cones and the second eye 3 is located essentially outside of all cones, hence the first eye 2 may see light emitted from essentially all front microlenses in the display segment 1 and the second eye 3 may see no light emitted from essentially any front microlens in the display segment 1. Such a calculation and selection of the size of subpixels is well known the art of autostereoscopic displays and may take as input a size of the display segment 1, an interocular distance between the first eye 2 and the second eye 3 and a distance from the display segment 1 to the observer.

Additionally, a cluster of sub-pixels may be illuminated together to essentially form a larger sub-pixel hence resulting in a larger divergence of emitted light cones which may accommodate for an observer moving closer to the display segment 1. Again, calculation of the size of such a cluster is well known in the art of autostereoscopic displays. The electrode lines may transmit address data for addressing more than one sub-pixel so that for example such a cluster of sub-pixels can be addressed.

Figure 4B:
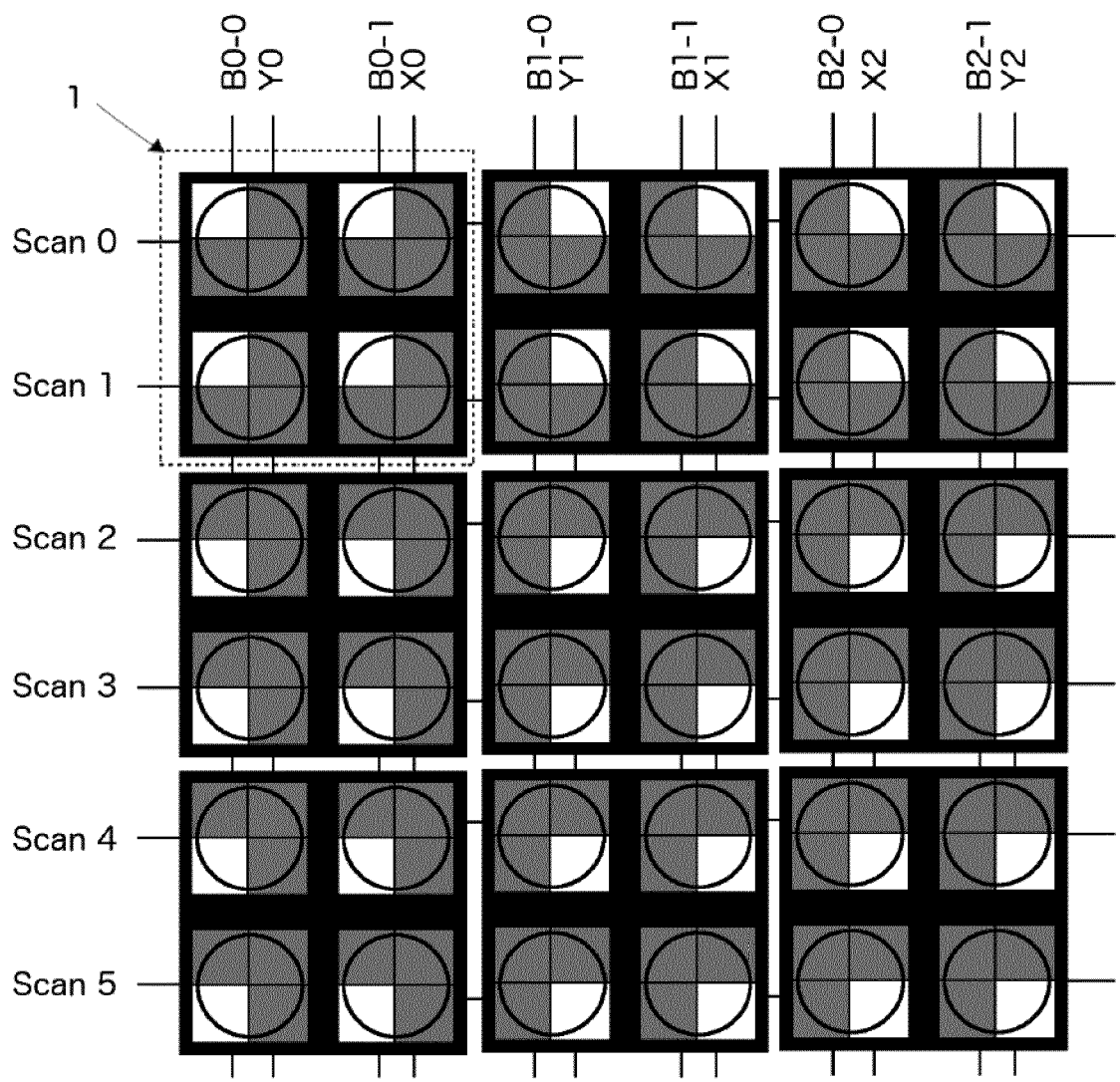

FIG. 4*b* shows a front view/schematic of a display having fewer pixels as well as fewer subpixels than the display illustrated in FIG. 4*a*.

Specifically, the display illustrated in FIG. 4*b* has 9 segments, and each segment has four pixels with four subpixels for each pixel.

Each subpixel is illustrated as a gray square, and the respective subpixel outputting light from each group of subpixels is illustrated as a white square.

Each lens in front of each pixel (group of subpixels) is illustrated as a black circle.

The 4 groups of subpixels in a first segment 1 are illustrated by the square with the striped outline, i.e. the first segment is the segment in the top left corner.

The subpixels that outputs lights from the groups of subpixels in a segment are arranged/positioned having the same relative position within a group.

In the segment of FIG. 4*b*, the data lines constitute electrode lines arranged as column lines (B0-0 to B2-1).

In the segment of FIG. 4*b*, the scan lines constitute electrode lines arranged as row lines (Scan 0 to Scan 5).

Six address lines (X0, Y0, X1, Y1, X2 and Y2) are illustrated in FIG. 4*b*.

FIGS. 5*a* to 5*g* shows electric circuits for displaying an image.

The components for light emitting may be OLEDs.

The circuits has either 4 pixels or 9 pixels and each pixel may have a number of "subpixels". The figures shows either 4 or 9 subpixels for each pixel. The concept behind the circuits in FIGS. 5*a* to 5*g* is that a circuit constitutes a segment where one address control circuit is arranged for addressing a subpixel in all of the pixels for controlling the direction of the emitted light. Different components in the circuit may be used for that addressing.

A circuit may be implemented in thin film technology.

Figure 5A:
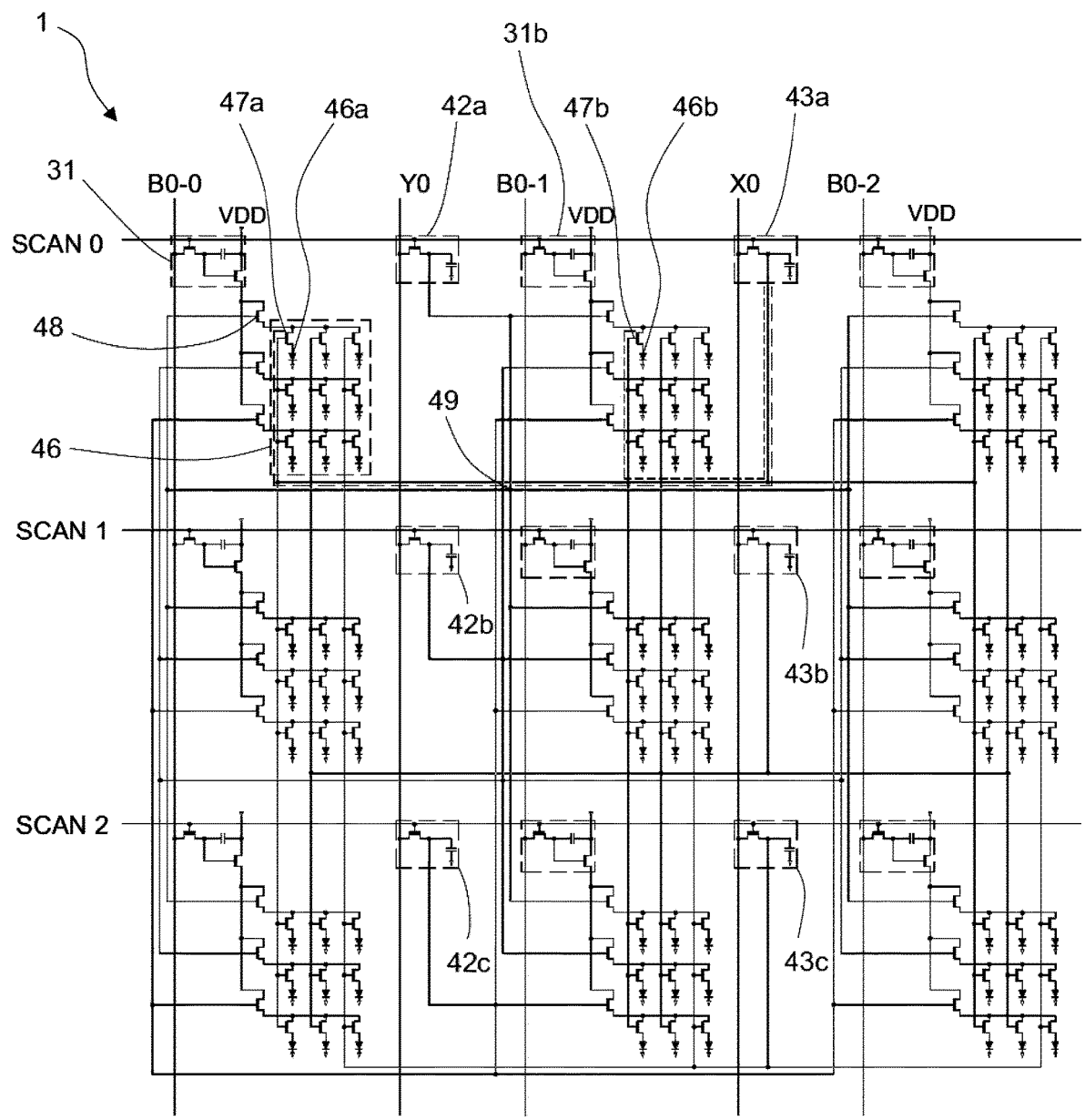
FIG. 5a shows an electric circuit is for displaying an image made up of 9 image pixels. The 9 image pixels are arranged in a 3 by 3 matrix.

FIG. 5*a* shows an electric circuit is for displaying an image made up of 9 image pixels. The 9 image pixels are arranged in a 3 by 3 matrix.

The electric circuit drives 81 addressable pixels. Each addressable pixel is for the present disclosure termed a subpixel. The subpixels are arranged in groups of 9, i.e. 9 groups each with 9 subpixels in each group.

Each image pixel is displayed by one of the 9 subpixels in a group of subpixels, i.e. for each image pixel to be displayed, one of 9 subpixels is addressed in order to output light so that in total 9 out of the 81 subpixels output light.

The subpixel to be addressed depend on the viewpoint of the observer, i.e. from where does the observer view the display.

A tracking system detects the position of the observer such that the subpixel that is visible from that viewpoint is addressed to output light. With 9 subpixels, there will be 9 viewpoints. When observing the display from another place than the viewpoint, the display will appear dark.

The circuit is arranged such that there is one pixel circuit for each group of subpixels. The pixel circuit is arranged to inject a current to a subpixel such that it outputs light. Each pixel circuit may comprise a pixel driver 31 for outputting the current.

Each subpixel in a group of subpixels is connected to the pixel driver through a first component and a second component, but the components to control the signal to a subpixel may be arranged otherwise as illustrated in some of the other of FIGS. 5*a* to 5*g*.

In total FIG. 5*a* illustrates 12 components in a pixel circuit for the addressing/switching of the pixel driver signal to the subpixels. Each component has a first input constituted by the signal output by the pixel driver or derived therefrom (amplified for example), and a second input for addressing/controlling the component. The output is constituted by the signal output by the pixel driver or derived therefrom. In the following the component is mentioned as a switch or transistor, but it may also be implanted as a group of transistors arranged as a logic circuit/gate.

In general, the pixel circuit may have more subpixels than components—when not counting the components constituting the pixel driver.

In FIG. 5*a* there are 9 subpixels and 12 components. In general, the number of components may not be more than the product of $r*(1+c)$ or $c*(1+r)$, where r is the number of rows and c is the number of columns. Alternatively, if there is only one row the number of components is not more than the number of columns.

The electric circuit also comprises a number of address control circuits. In total there are 6 address control circuits (42*a*, 42*b*, 42*c*, 43*a*, 43*b*, 43*c*). The six address control circuits outputs 6 control signals for the 12 switches in each pixel circuit, i.e. the same six control signals are transmitted to each pixel circuit. This reduces the number of transistors in the electric circuit, and it reduces the number of data lines needed to transmit control signals to the subpixels, i.e. if each subpixel where to have its own data line there would need to be 81 data lines.

The electric circuit in FIG. 5a has 8 data lines arranged as three scan lines (Scan_0, Scan_1, Scan_2), three brightness data lines (B_0, B_1, B2), and two address data lines (X, Y).

Thus, when scanline Scan_0 is high, brightness values transmitted by brightness value lines B_0, B_1 and B_2 may be read into the three pixel drivers connected to Scan_0 and B_0, B_1 and B_2. Furthermore, control signals transmitted by address data lines X, and Y may be read into the two address control circuits connected to Scan_0 and X and Y.

Specifically, a first address control circuit 42a (subpixel address data sampleand-hold circuit) samples the high or low output on the address electrode line Y0 when the row control signal Scan 0 is active and likewise holds it for the duration of a frame (it memorises).

A first subpixel 46a is connected through a first switch 47a to the pixel driver 31. The switch/component being part of the electric circuit illustrated in FIG. 5a.

The first switch has a first input for switching the first switch. The first input is connected to a second address control circuit 43a. The striped line in FIG. 5a illustrates the signal path.

A second subpixel 46b is connected through a second switch 47b (or transistor or logic circuit) to a second pixel driver 31b. The second switch has a second input for switching the second switch. The second input is connected to the second address control circuit 43a. The dotted line illustrates the signal path—at junction 49 the line from the first address control circuit split up in three.

All of the subpixels in the first column are connected through a switch to the first pixel driver, and all of these switches has their switch inputs connected to the first address control circuit 42a—in general all of the subpixels in the first column in each group of subpixels of a segment is connected to a respective pixel driver through a switch, and all of these switches has their switch inputs connected to the first address control circuit i.e. 27 switches are connected to the output of the first address control circuit— the first address control signals is for selecting a column of subpixels (for each "image" pixel).

The first address control circuit 42a is for selecting a row of subpixels, i.e. all of the subpixels in the first row of a group of subpixels is connected through a third switch 48 to the pixel driver 31.

A group of subpixels having subpixels arranged/positioned in more than 1 dimension has all of its subpixels connected to a pixel driver through two switches.

As can be seen from the diagram, subpixels in corresponding positions in other pixels are connected similarly through switches to the sub-pixel address sample-and-hold circuit 42A and the sub-pixel address sample-and-hold circuit 43A to their respective pixel drives, hence sub-pixels in identical positions in different pixels will emit light and the brightness of emitted light will be controlled by stored pixel values in pixel drivers corresponding to each pixel. Subpixels in other positions are connected similar to the other subpixel address sample-and-hold circuits and respective pixel drivers.

In other words, stored values clocked into subpixel address sample-and-hold circuits are controlling which sub-pixel positions emit light and hence the angle of emitted light from the segment, and stored values in pixel drivers control the brightness of emitted light from each pixel.

Hence when both the output of the sub-pixel address data sample-and-hold circuit 42A and the output of the sub-pixel addressing data sample-and-hold circuit 43A are high, both the switching transistor 48 and the switching transistor 47a are conducting and a current can flow from the pixel driver 31 through the organic light emitting diode.

Looking now at the first set/group of subpixels 46 in the first pixel, we can see that it is arranged in columns and rows, which can also be referred to as X and Y positions, and that address control signals stored in sample-and-hold circuits/registers 43A, 43B and 43C control which X positions have active signal and that address control signal stored in sample-and-hold registers 42A, 42B and 42C control which Y positions have active signals and that only subpixels located both in an active X position and in an active Y position are illuminated.

We can call the values stored in 43A, 43B and 43C for X bits and the values stored in 42A, 42B and 42C for Y bits, where a high voltage is considered to be a "1" value and a low voltage is considered a "0" value. Hence if for example the X bits are 0, 1, 0 and the Y bits are 0, 1, 0 only the middle subpixel in each pixel will be "on", i.e. emit light. The brightness will depend on the individual pixel drivers. Likewise, if the X bits are 1, 0, 0 and the Y bits are 1, 0, 0 the top left subpixels will be on.

We can also see that it is possible to switch more than one sub-pixel position, for example a cluster of sub-pixels, on. For example, if the X bits are 1, 1, 0 and the Y bits are 1, 1, 0, a cluster comprising the four top left sub-pixels will be on in four pixels (the top left, top middle, middle left and middle middle). As can be seen from the diagram, if more than one sub-pixel is on, a current in a pixel driver is flowing through more than one organic light emitting diode.

Said in other words, a group of 9 subpixels is arranged in a two dimensional coordinate system, i.e. a subpixel may be addressed by two control signals (a pair of address coordinates). Thus, the first control signal is used for the subpixel address in the first dimension, and the second control signal is used for the subpixel address in the second dimension.

The 6 address circuits are arranged such that 3 of the address circuits are for the subpixel address in the first dimension and the other 3 address circuits are for the subpixel address in the second dimension.

The 12 switches of a pixel circuit are arranged in groups. Three of the switches are for the subpixel address in the first dimension. These three switches are connected to the three address circuits for the first dimension respectively. The remaining 9 switches are for the subpixel address in the second dimension.

These 9 switches are arranged in groups of three switches in each group, i.e.:
- the first group of three switches are connected to the Scan0/Y0 address control circuit 42a for addressing in the second dimension,
- the second group of three switches are connected to Scan1/Y0 address control circuit,
- the third group of three switches are connected to Scan2/Y0 address control circuit.

This is the case for each pixel circuit, which is exemplified in the following:

The electric circuit has a first pixel circuit comprising a first subpixel connected to a first pixel driver through a first pair of switches (first X switch and first Y switch), and a second pixel circuit comprising a second subpixel connected to a second pixel driver through a second pair of switches (second X switch and second Y switch).

The first pixel circuit is for outputting the light for a first image pixel, and the second pixel circuit is for outputting the light for a second image pixel.

The first subpixel has the same address in the group of subpixels in the first pixel circuit as the second subpixel has in the group of subpixels in the second pixel circuit. And that first subpixel is addressed by means of the same address coordinate pair as the second subpixel may be address by, i.e. the first X switch (such as the switch/transistor right before the top-left subpixel in the first pixel circuit—the first pixel circuit being the topleft pixel circuit—there are 9 X switches in the pixel circuit) is connected to the Scan0/X0 address control circuit of the group of address circuits for the first dimension.

The second X switch (the top-left switch in the second pixel circuit—the second pixel circuit being right below the first pixel circuit) is connected to that same address control circuit. Thus, the first X switch and the second X switch are connected in parallel to the same address circuit (it is the control inputs/terminals that are connected to the address control circuit). For a transistor the control input/terminal is normally denoted gate or base depending on the transistor technology.

Similarly, the first Y switch is connected to the first address circuit of the group of address circuits for the second dimension, and the second Y switch is connected to that same address circuit. Thus, the first Y switch and the second Y switch are connected in parallel to the same address circuit (it is the control inputs/terminals that are connected to the address control circuit).

A switch may be implemented as a transistor. Two transistors may also be used to make up a switch.

The above arrangement of the electric circuit is an optimized embodiment to minimize for example the number of transistors within a group of subpixels. However, more transistors may be used, for example two transistors may be used for each subpixel giving a total of 18 transistors for a group of 9 subpixels (not including transistors used in the driver circuit for the group of subpixels.

Each group of subpixels has a driver circuit to ensure that whichever subpixel is addressed/switched on to output light, outputs light with a brightness controlled by the driver circuit of that subpixel. Whichever subpixel outputs light it will be with the same brightness as had it been another subpixel that had been addressed—the purpose of the subpixels is to control that the image is displayed in a direction towards an intended viewpoint.

The pixel driver 31 may comprise a sample-and-hold circuit and a current source controlled by the output value of the sample-and-hold circuit.

The pixel driver 31 samples the analog column control signal B0-0 when the row control signal Scan 0 is active and holds it essentially as long as a video frame is displayed.

The strength of the current is controlled by the pixel driver 31. Hence the first subpixel will emit light of a brightness controlled by the brightness value stored in the pixel driver 31.

The subpixels may be an organic light emitting diode manufactured in thin film and located in close positions and hence has very similar characteristics, so the current is essentially equally divided between sub-pixels which are "on". In one configuration the pixel value stored in the pixel driver may be compensated for the number of subpixels which are on, so it for example four sub-pixels are on, the current is calculated to be four times stronger than a current for a pixel with only one sub-pixel being on and having the same intended brightness.

In another configuration the number of subpixels in the display segment 1 which are on may be kept at a constant number.

As mentioned above, the size of a subpixel cluster may be calculated based on amongst other factors a distance to the observer so the first eye 2 of the observer sees light from all pixels in a segment and so the second eye 3 of the observer sees no light from any pixel in the segment.

In order to keep the number of subpixels on constant, subpixels in "don't care" positions may be turned on or off, depending on the number of sub-pixels required for the cluster. A "don't care" position may be calculated as a subpixel position which is corresponding to a light emission direction which is not towards any eye of any observer.

Switching transistors in FIG. 5a are shown as generic FET transistors. In practice they may be thin film transistors and transistor characteristics and configurations such as n-type or p-type and other characteristics including voltage levels may in practice be designed so the transistors operate as bi-directional switches. Such thin film circuit design is well known in the art of active matrix display, thin film sample-and-hold circuits and for example thin film gate-driver-on-array circuits.

The electric circuit is scalable in that a segment may be for a much higher number of image pixels, and for each image pixels there may be a much higher number of sub-pixels.

Figure 5B:
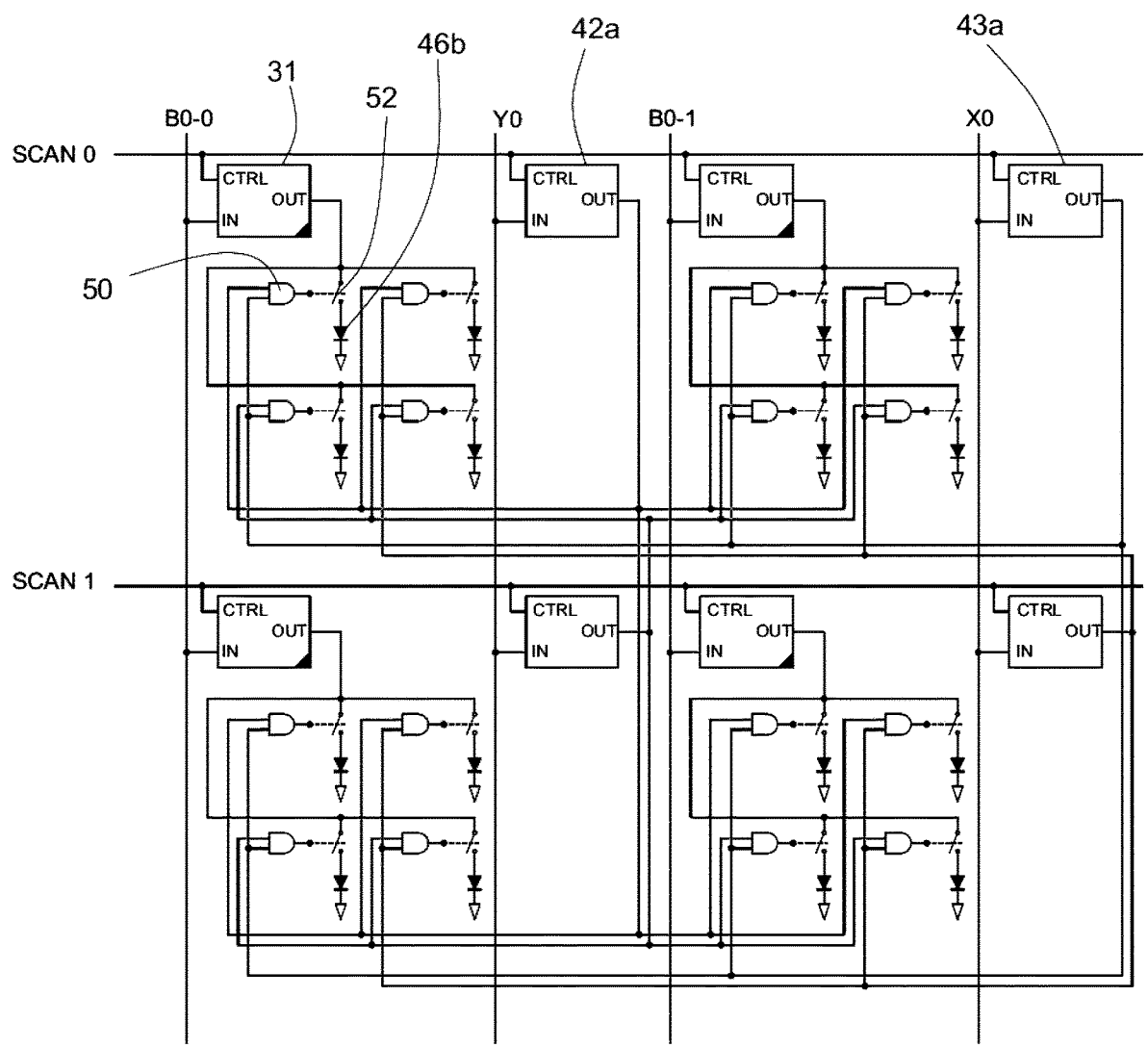
FIG. 5b shows a high level electric circuit.

FIG. 5b shows a high level electric circuit.

The electric circuit is for displaying an image made up of 4 image pixels. The 4 image pixels are arranged in a 2 by 2 matrix.

The principle of the circuit in FIG. 5b is the same as the circuit in FIG. 5a, but the discrete components have been placed in either logic gates or blocks. The pixel driver is shown as block 31, and a logic gate 50 (may be an And gate) and switch 52 controls the signal that is to drive a subpixel.

The output of each logic gate turns the associated switch on and off. When the switch is on the associated subpixel is driven by the signal from the pixel driver.

Each logic gate has two inputs, which are the output from a first address control circuit 42a and the output from a second address control circuit 43a.

When both inputs to the logic gate are high the switch 52 is turned on.

As for the circuit in FIG. 5a, there are address control circuits for the control/addressing of the "row" and there are address control circuits for the control/addressing of the column. Since there are 2 times 2 subpixels there are 2 rows and 2 columns of subpixels. One address control circuits controls/addresses more than one pixel, i.e. in a segment of image pixels there is one subpixel for each image pixel that is controlled by a single address circuit.

Figure 5C:
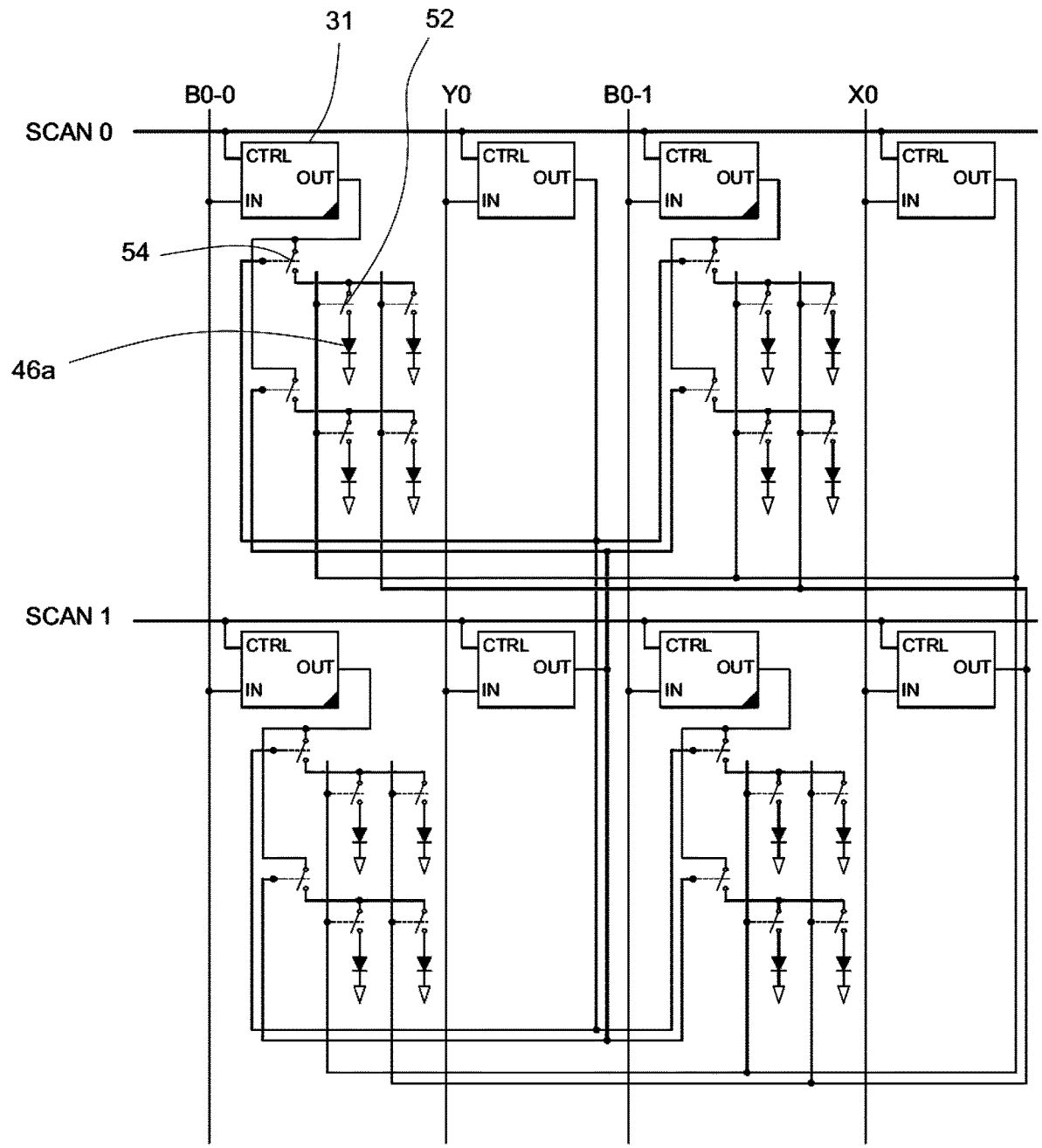
FIG. 5c shows a mid level electric circuit.

FIG. 5c shows a mid level electric circuit.

The electric circuit is for displaying an image made up of 4 image pixels. The 4 image pixels are arranged in a 2 by 2 matrix.

The principle of the circuit in FIG. 5c is the same as the circuit in FIGS. 5a and 5b, but the drivers have been illustrated as blocks and the controls as switches. The pixel driver is shown as block 31.

There is one switch associated with each subpixel, i.e. a first switch 54 is at/before a first subpixel 46a. Each of these switches may be termed a column switch, because the control input to each switch for each subpixel is connected to the output of address control circuits for controlling the addressing of a column, i.e. the addressing in the X-direction or horizontal direction (when the display is arranged in its intended position).

A second set of switches, which may be termed row switches, are used to control the column switches, i.e. the control input to column switch is connected to the output of address control circuits for controlling the addressing of a row (of row switches). When a row switch is on, a pixel driver signal is output from the addressed row switch and goes to a column switch.

Figure 5D:
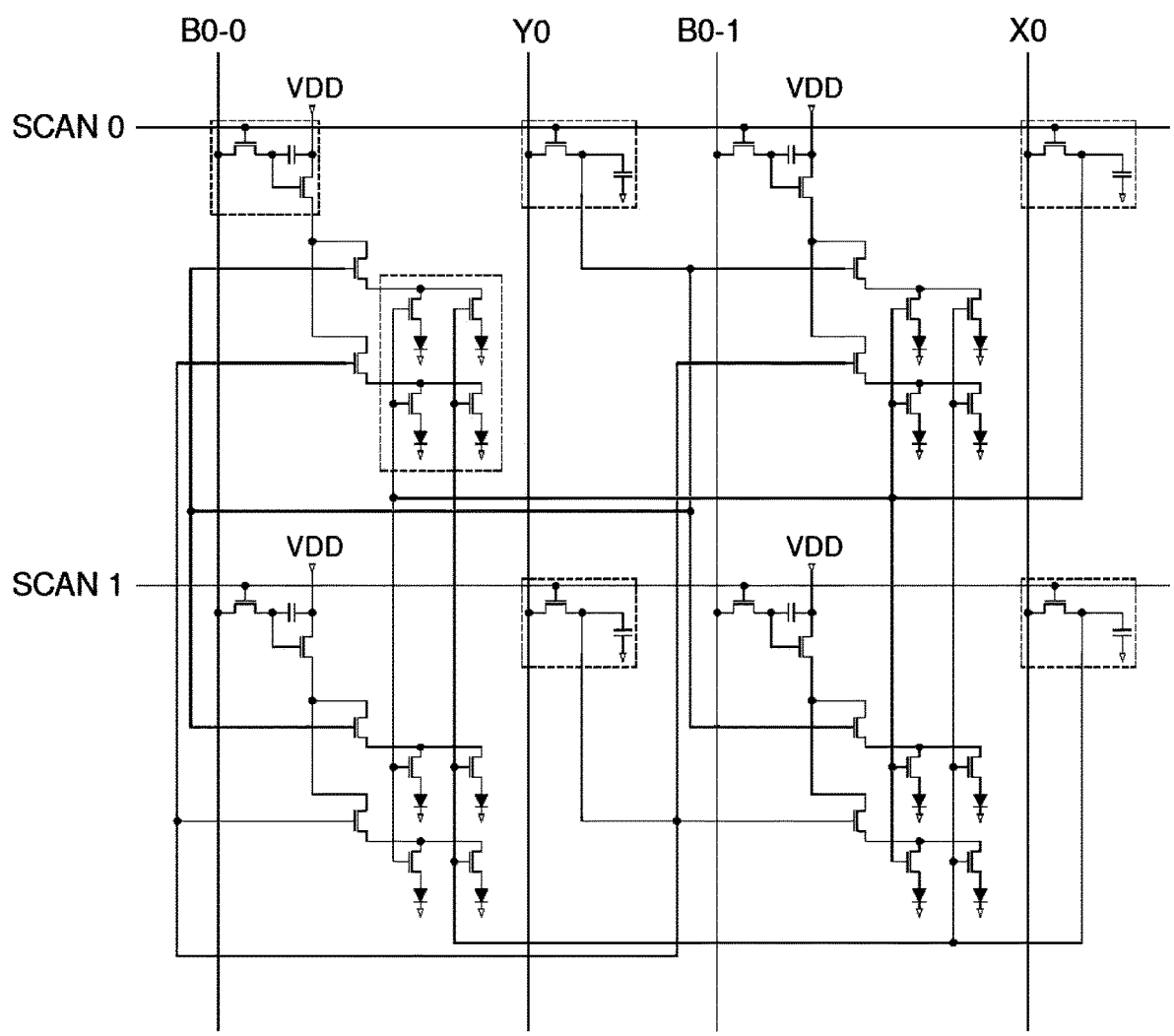
FIG. 5d corresponds to FIG. 5a, but only for displaying an image made up of 4 image pixels with four subpixels in each pixel.

FIG. 5d corresponds to FIG. 5a, but only for displaying an image made up of 4 image pixels with four subpixels in each pixel.

Figure 5E:
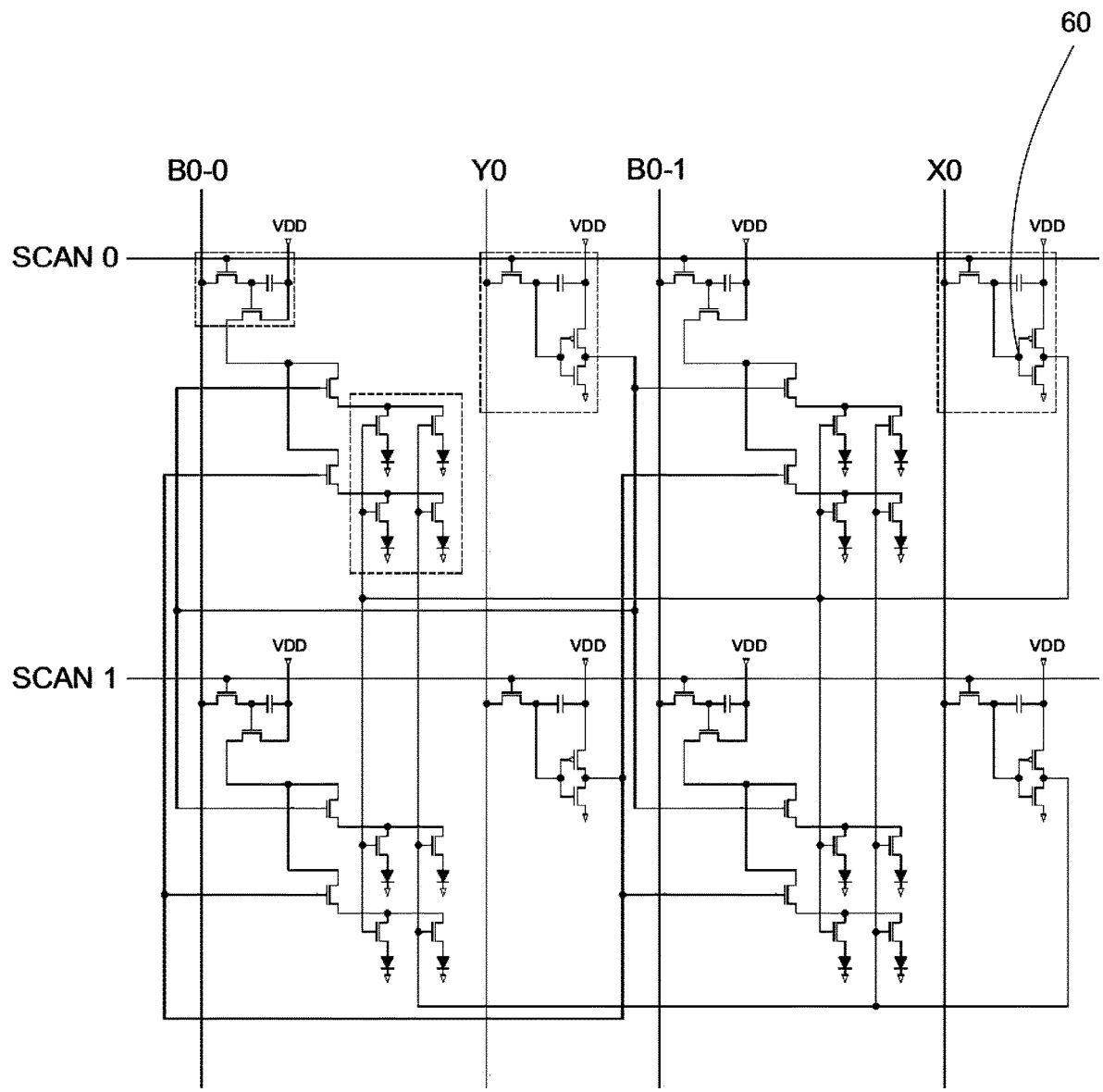
FIG. 5e illustrates the addition of an amplifier 60 to each address control circuit, i.e. the output of an address control circuit is amplified.

FIG. 5e illustrates the addition of an amplifier 60 to each address control circuit, i.e. the output of an address control circuit is amplified.

The amplifier is illustrated as two transistors, i.e. a push-pull amplifier.

Each address control circuit (the output) sees a capacitive and a resistance load, because the output to each address control circuit may be directed/routed to a large plurality of switches. An amplifier may provide compensation for that, i.e. the load may be so high due to the many wires the output of the address control circuit has to go through that the address control circuit without an amplifier may not be able to drive the switches.

Figure 5F:
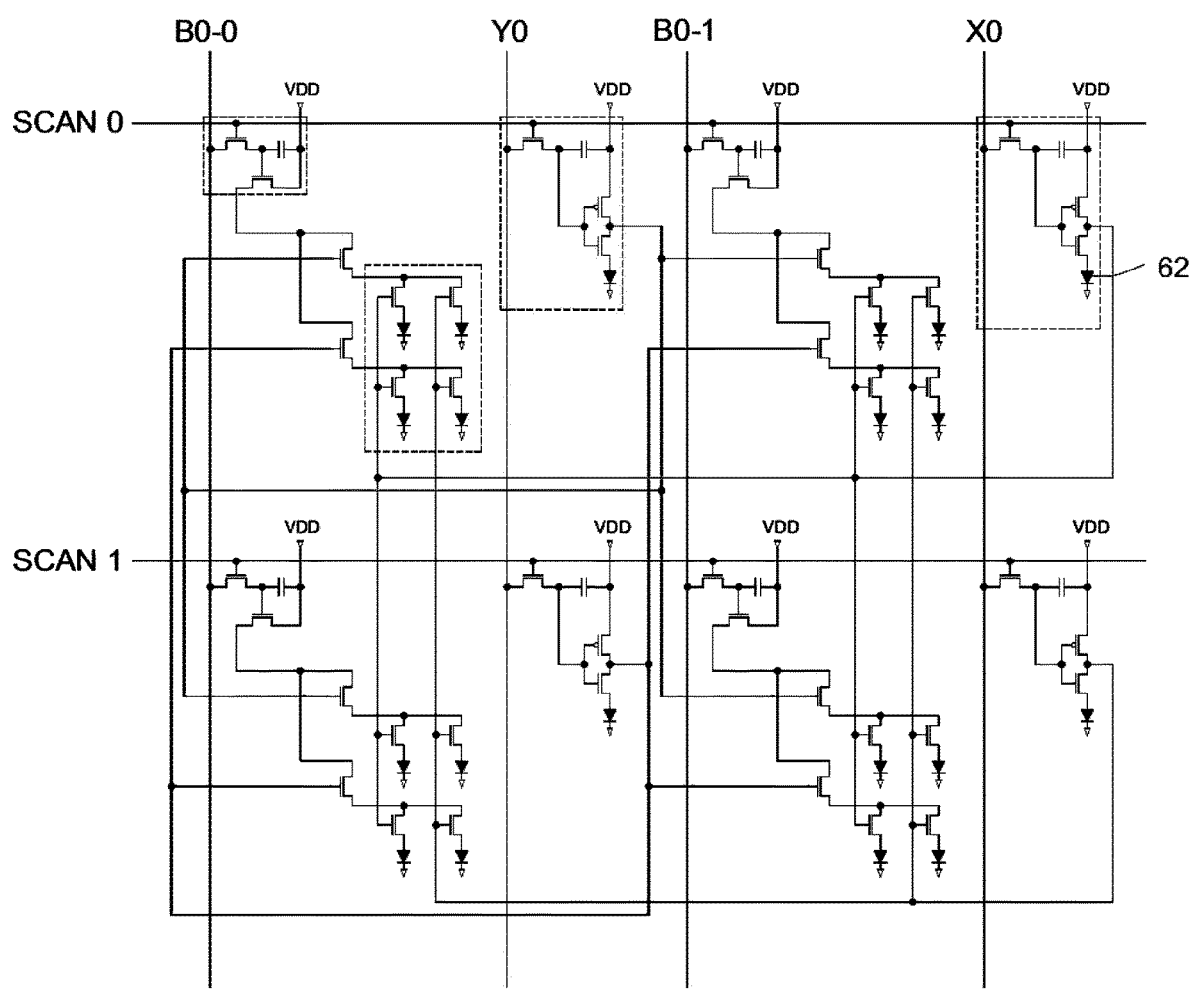
FIG. 5f also illustrates that an amplifier is added to each address control circuit.

FIG. 5f also illustrates that an amplifier is added to each address control circuit.

In FIG. 5f the amplifier return path goes to signal ground through a diode 62 such as OLED.

Figure 5G:
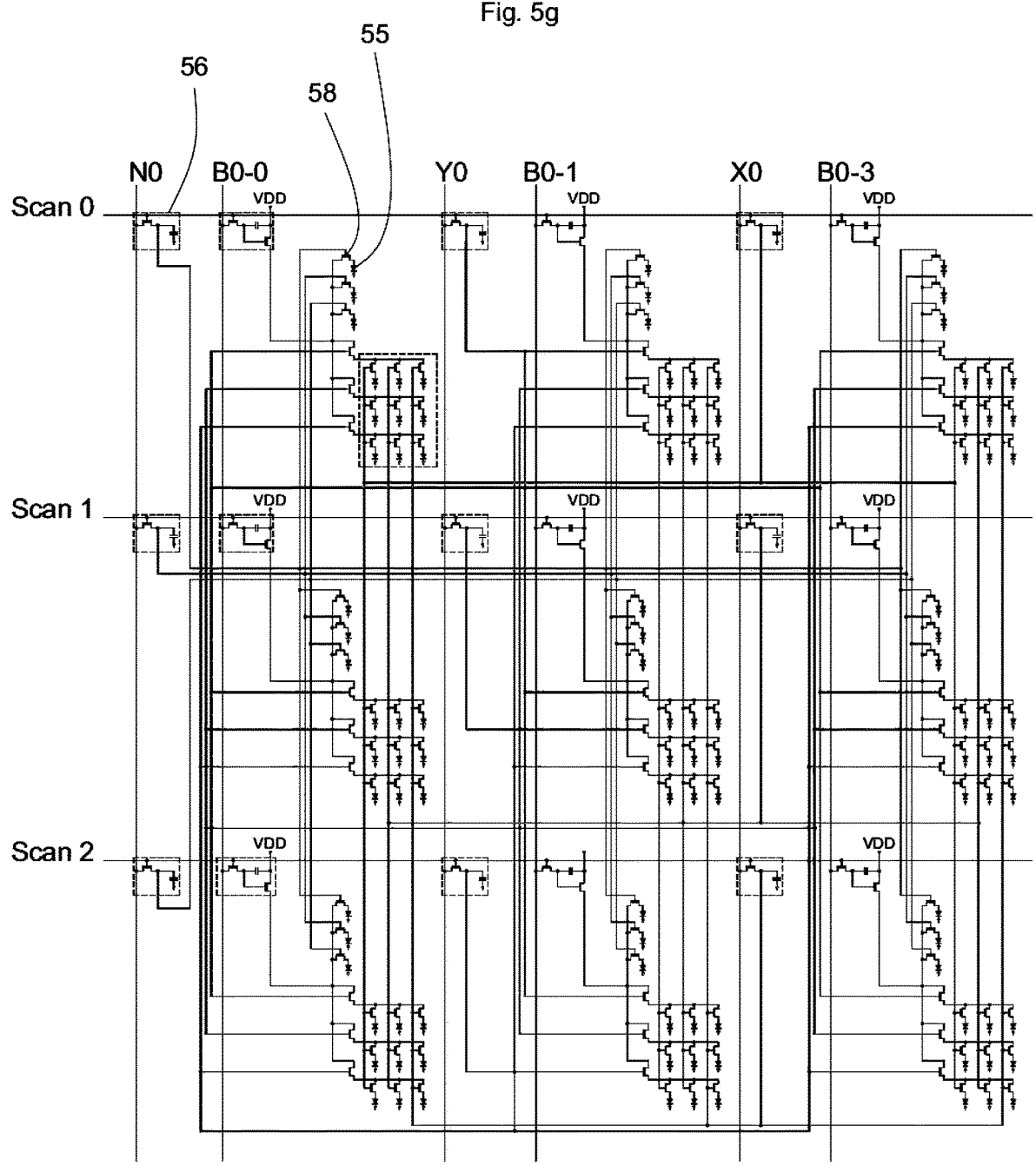
FIG. 5g shows an electric circuit.

FIG. 5g shows an electric circuit.

The electric circuit is for displaying an image made up of 9 image pixels. The 9 image pixels are arranged in a 3 by 3 matrix.

The circuit corresponds to the type of circuit described in connection with the previous figures, and FIG. 5g is to illustrate the addition of dummy or null pixels (such as a first dummy pixel 55)—pixels arranged in order to control the stability or balance of the light emission or current through the electric circuit.

For example, it may be desired that more than one subpixel is on/emits light for each pixel, but only one subpixel is to be seen by an observer.

Thus, a dummy subpixel may be arranged and have a position such that the dummy subpixel emits light that is not visible from any of the positions defined by the subpixels inside the grid of subpixels.

In FIG. 5g a plurality of dummy subpixels is illustrated, specifically three dummy subpixels for each pixel, and a plurality of dummy address control circuits, specifically three dummy address control circuits.

In general, the circuit may have a plurality of subpixels and the subpixels that may be addressed to emit light in a direction towards an observer constitute a number less than the total number of subpixels.

The pixel driver for each pixel circuit also drives the dummy subpixel(s), i.e. each dummy subpixel may be connected to the pixel driver through a component such as a first component 58 for the addressing/switching of the pixel driver signal to the dummy subpixel—in the same way as how the subpixels are addressed/switched. The component may be a switch or a transistor or logic circuit in general.

The component/logic circuit may receive a control input from a dummy address control circuit such as a first dummy address control circuit 56. The dummy address control circuit is for addressing a dummy subpixel such that when a dummy subpixel is addressed it emits light.

Three dummy address control circuits are shown in FIG. 5g.

The number of subpixels that may be turned on may depend on the distance for which the observer is observing the display.

If the observer is close to the display it may be necessary to turn on more than one subpixel in a pixel so that if the observer moves the observer will still see the same image.

If the observer is far from the display it may be enough that only a single subpixel is turned on, because even if the observer moves it is less likely that he will move so much so fast that the display is not able to update to the new position of the observer.

For a position close to the display it could be that the display does not update fast enough if there is only one subpixel turned on so that the observer moves out of the image, i.e. moves to a position where no image is directed to.

Due to such varying number of subpixels (load) being turned on and off, the dummy subpixels may provide a more even load over time such that the same number of subpixels may be on for each image frame.

Figure 6A:
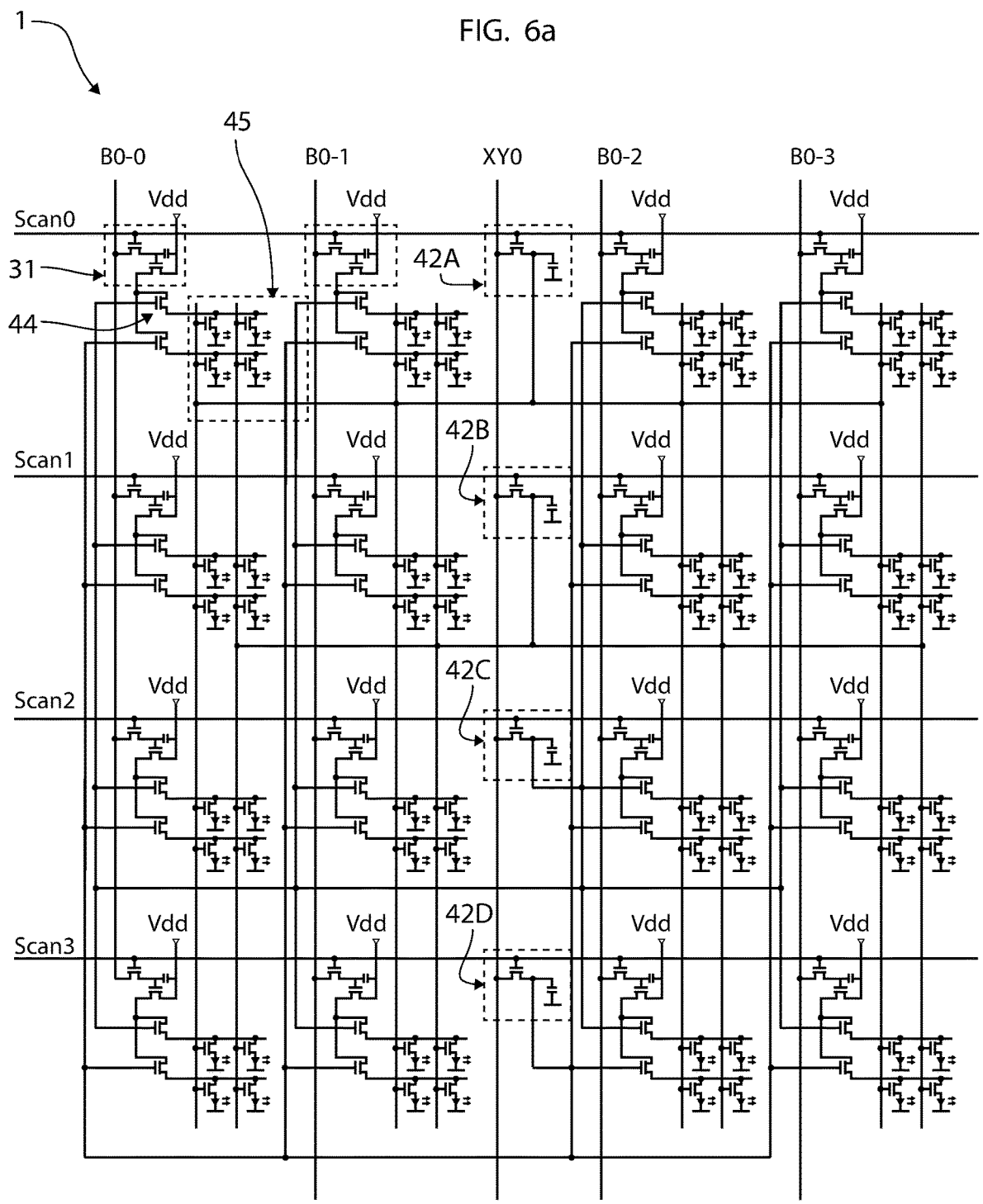
FIG. 6a shows another example of a configuration of an electrical circuit for the display segment 1.

FIG. 6a shows another example of a configuration of an electrical circuit for the display segment 1.

In this example the display segment 1 has 16 pixels with 4 sub-pixels each, arranged in 2×2 grids, and there is only one address electrode line XY0. The operation of the circuit is similar to the circuit in FIG. 5a, but here sample-and-hold circuits 42A and 42B are used for X position addressing of sub-pixels and sample-and-hold circuits 42C and 42D are used for Y position addressing of sub-pixels and all sample-and-holds circuits 42A-D are connected to the only one address electrode line XY0.

Figure 6B:
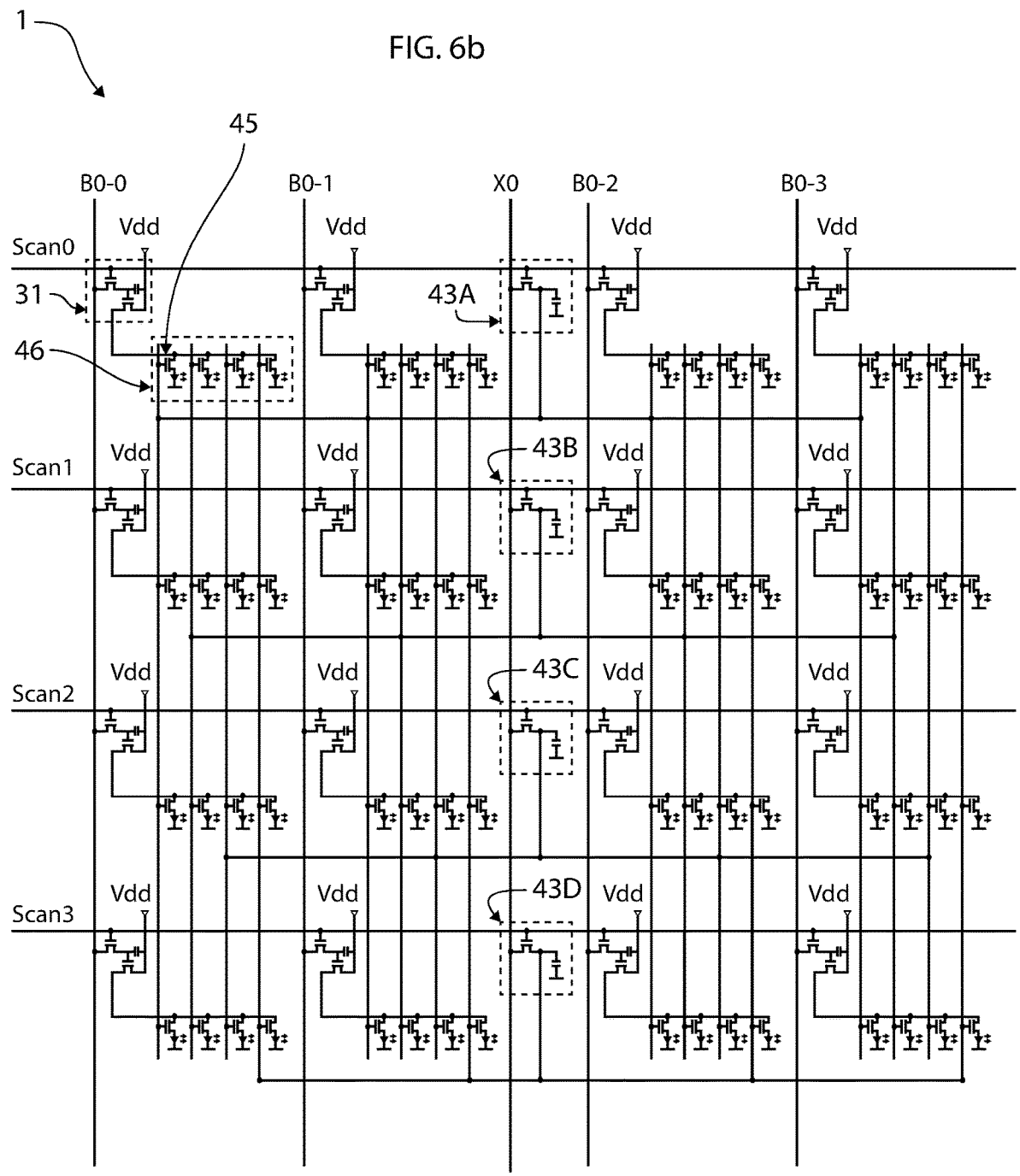
FIG. 6b shows yet another example of a configuration of an electrical circuit for the display segment 1.

FIG. 6b shows yet another example of a configuration of an electrical circuit for the display segment 1.

In this example the display segment 1 has 16 pixels with 4 sub-pixels each arranged in a single row. Sample-and-hold circuits 42A-D are all used for X-position addressing. In this configuration sub-pixels may be elongated and/or the front microlens array 8 may comprise cylindrical lenses.

Figure 7:
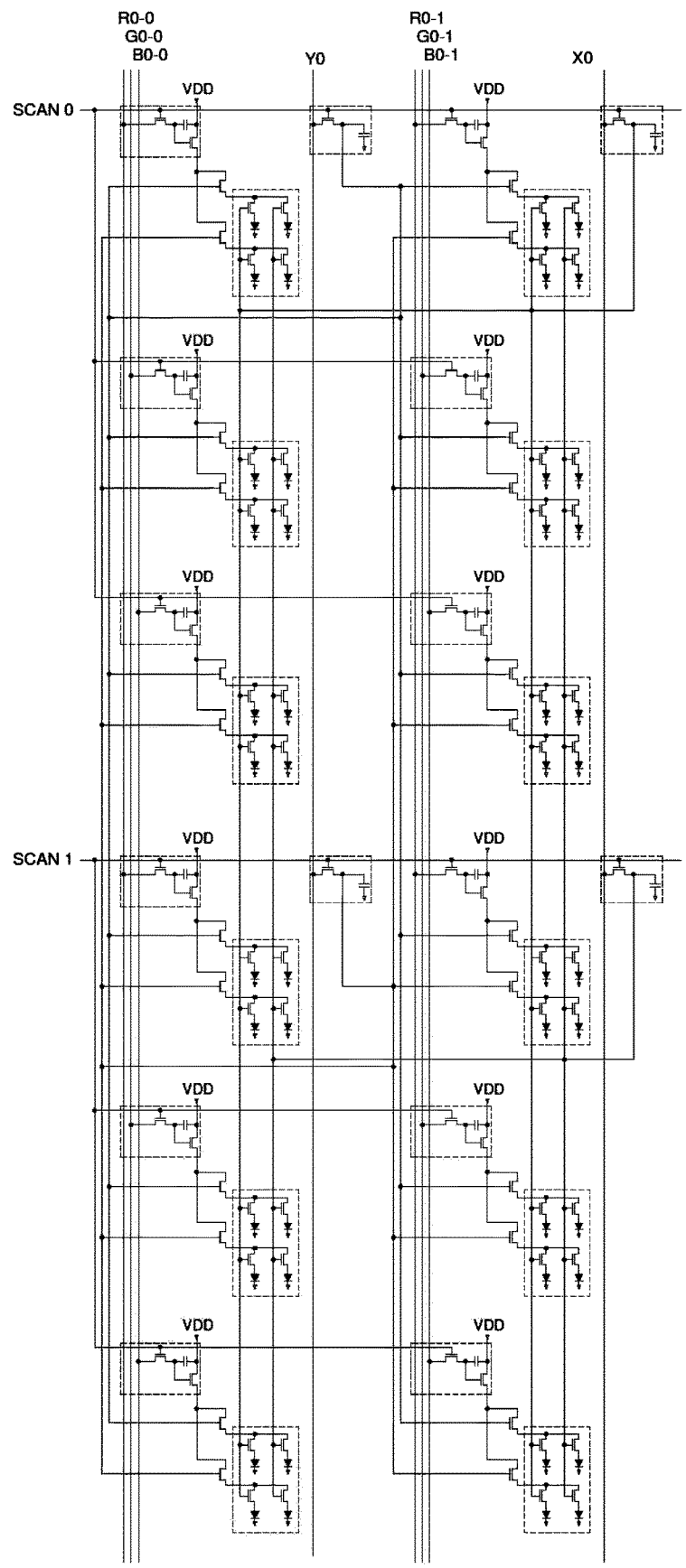
FIG. 7 shows an electric circuit.

FIG. 7 shows an electric circuit.

The electric circuit is for displaying an image made up of 4 image pixels to display a color image.

In general, there are two technologies for displaying color.

One way is to provide one red image pixel, one green image and one blue image pixel next to each other. This is illustrated in FIG. 7.

Another way is to place a color mask between the pixels and the observer so that a first image pixel has a red color filter such that it emits red light, a second image pixel has a green color filter such that it emits green light, a third image pixel has a blue color filter such that it emits blue light. The first, second and third image pixel are next to each other.

Figure 8:
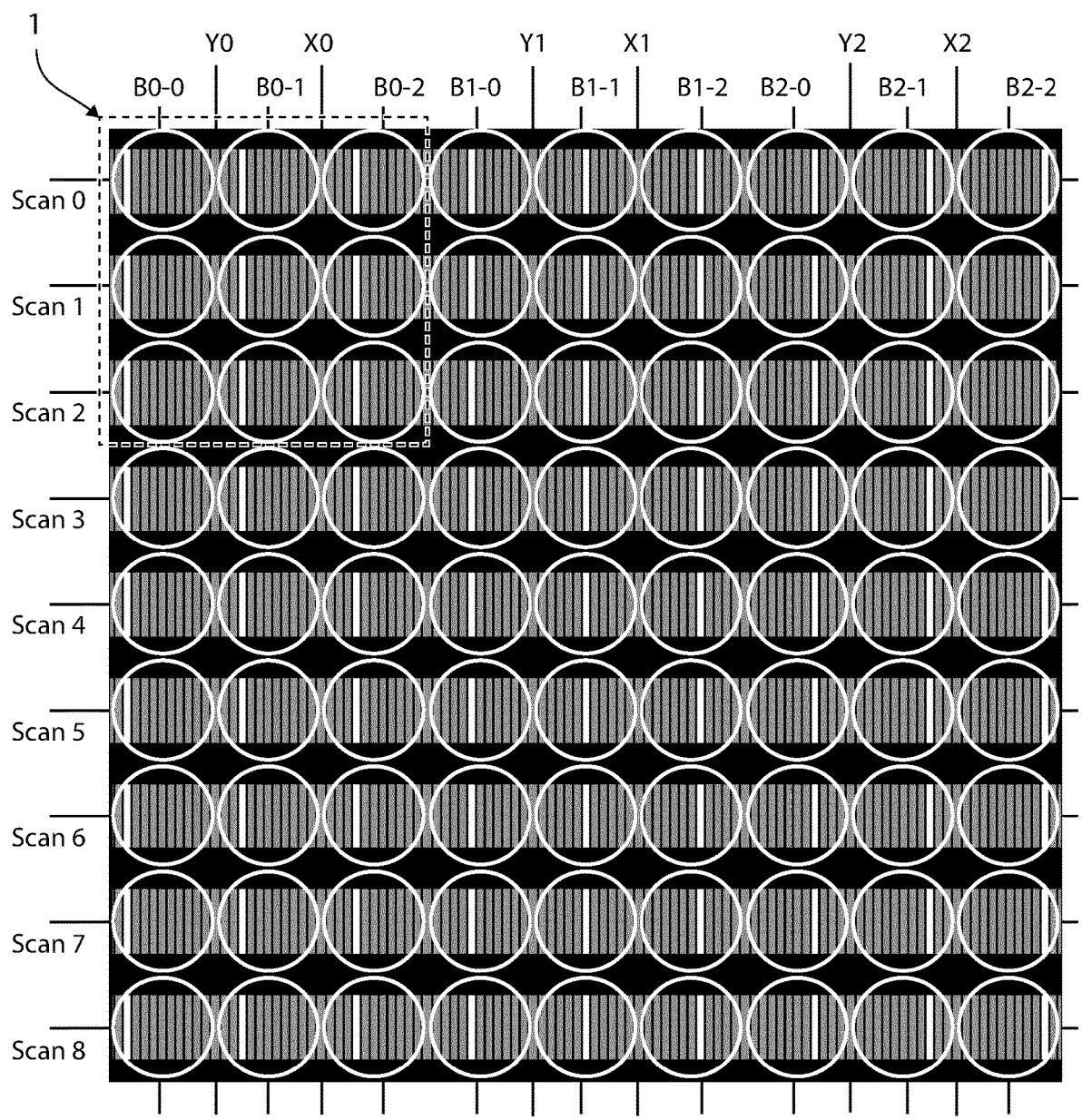
FIG. 8 shows an example of a configuration of a display comprising 81 pixels arranged in 9 display segments with 9 pixels each, where sub-pixels are elongated.

FIG. 8 shows an example of a configuration of a display comprising 81 pixels arranged in 9 display segments with 9 pixels each, where sub-pixels are elongated.

In this configuration subpixels are arranged so subpixels of adjacent pixels have the same distance as the distance between subpixels in the same pixel.

An advantage is that microlenses 8A may have a longer focal length and may transmit and refract emitted light from subpixels in an adjacent pixel hence providing large angles without a need for very short focal lengths, which may be difficult to manufacture in high quality.

Figure 9A:
FIG. 9a shows a color filter/mask for a color display.
Figure 9A:
Figure 9A:
Figure 9A:
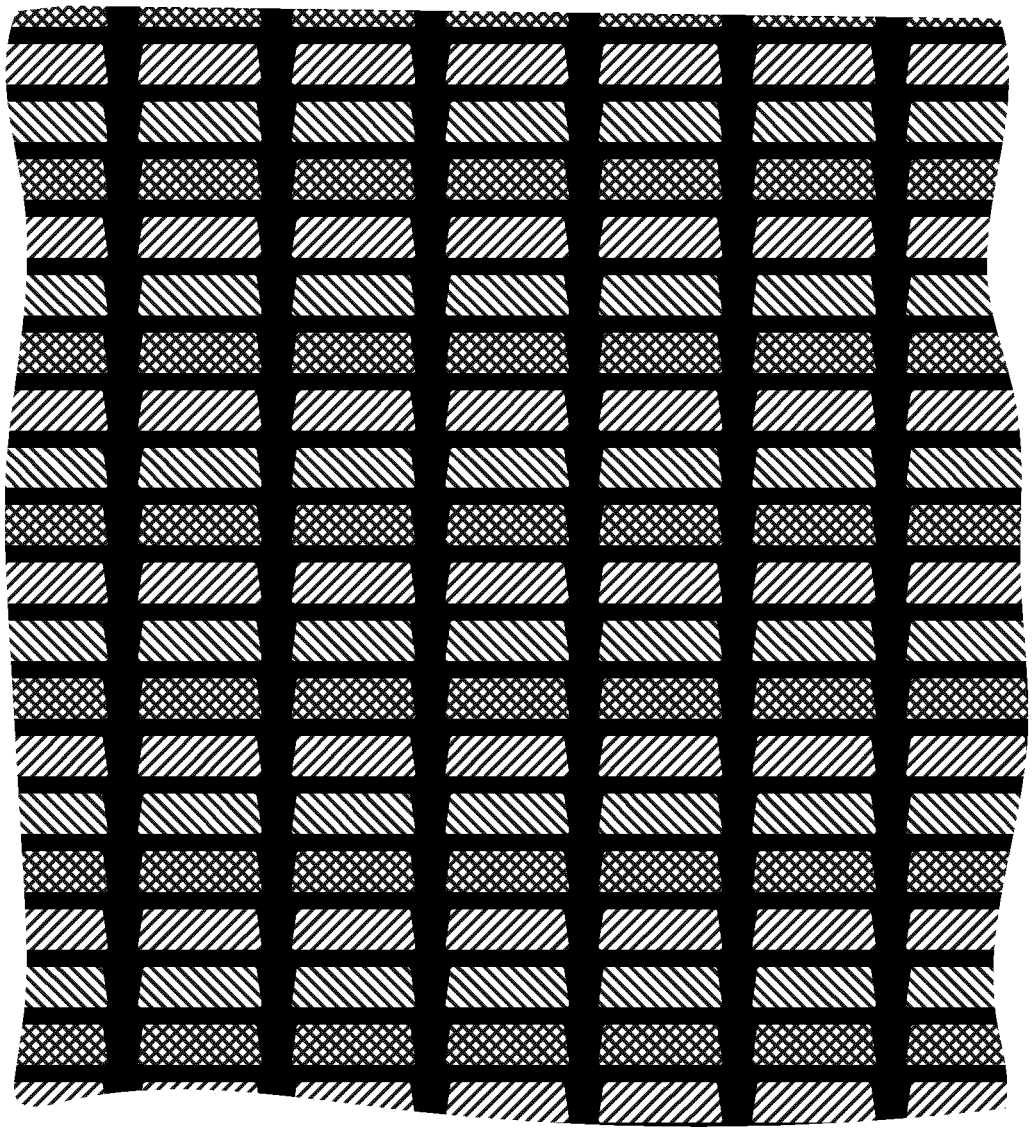

FIG. 9a shows a color filter/mask for a color display.

The color mask is a pattern of three colors, and has a first row of blue colored filters for transmitting blue light, a second row (below the first row) of green colored filters for transmitting green light, and a third row (below the second row) for transmitting blue light.

The first three rows covers a first line of image pixels.

The pattern in the first three rows is repeated down the color mask. The pattern/sequence of colors in the vertical direction may be different, for example blue followed by green followed by red.

Thus, the (three) different colors of the color mask is ordered vertically, i.e. a successive order in the vertical direction.

A respective filter may as such not necessarily have a color when the display is off, but when observing the display when the display is turned on, the light coming from a respective filter means that the respective filter may be perceived as having a color.

The display may be a directional display as described above, i.e. a display having addressable subpixels for directing light towards an observer—specifically towards the left eye and right eye of the observer such that the observer perceives a 3D image (both eyes may not see the same image if a 3D image is to be perceived—the left eye is to see an image for the left eye and the right eye is to see an image for the right eye).

The display uses light transmitters emitting white light. Each light transmitter may be a LED such as an OLED or LCD modulating a backlight.

Each pixel may be divided in three parts for generating a color, i.e. a first group of subpixels (within the pixel) may be for a first color, a second group of subpixels (within the pixel) may be for a second color, and a third group of subpixels (within the pixel) may be for a third color.

Colors may be generated by means of the color mask.

The color mask is placed in front of the pixels of the display—arranged between the pixels and the observer.

In front of the first part of the pixel may be a first color filter for transmitting a first color of the incident light spectrum (such as red), and filtering away (reflecting or absorbing) the other parts of the incident spectrum);

In front of the second part of the pixel may be a second color filter for transmitting a first color of the incident light spectrum (such as green).

In front of the third part of the pixel may be a third color filter for transmitting a third color of the incident light spectrum (such as blue).

Figure 9B:
FIG. 9b is a zoom on an individual pixel.
Figure 9B:
Figure 9B:
Figure 9B:
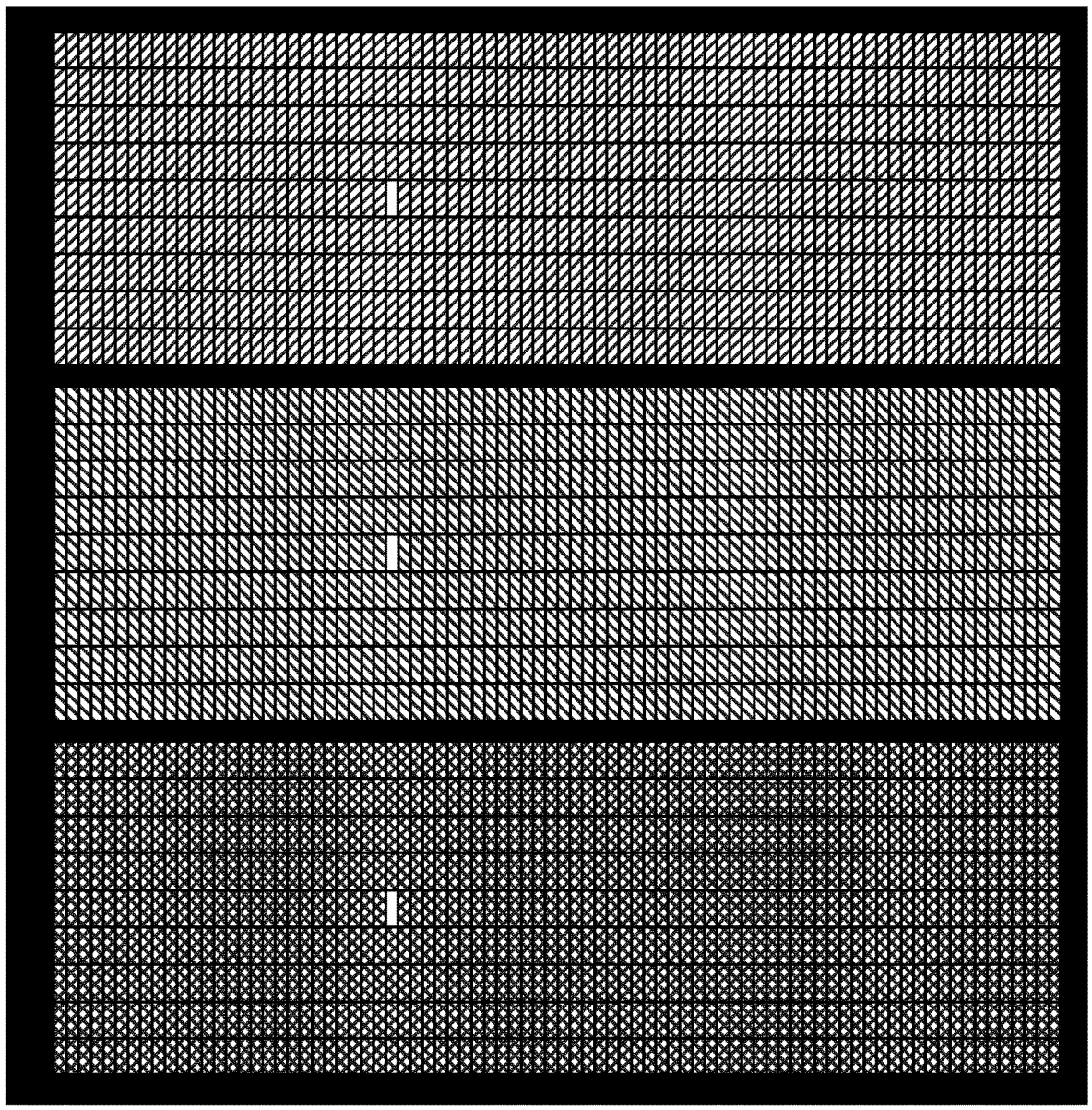

FIG. 9b is a zoom on an individual pixel.

A first color filter is arranged over/covers the upper part of the pixel (illustrated in red color). The group of subpixels arranged behind the first color filter constitutes a first "RGB subpixel".

A second color filter is arranged over/covers the middle part of the pixel. A third filter is arranged over/covers the bottom part of the pixel. The group of subpixels arranged behind the second color filter constitutes a second "RGB subpixel".

The second color filter is between the first color filter and the third color filter. The group of subpixels arranged behind the third color filter constitutes a third "RGB subpixel".

For each RGB subpixel there is a single subpixel turned out (illustrated as being brighter than the other subpixels).

Each RGB subpixel has a horizontal elongation, i.e. there are a higher number of subpixel in the horizontal direction than in the vertical direction in order to have a higher horizontal resolution—the eyes of the observer are horizontally arranged in normal viewing situations.

Each color filter has an elongated shape with a width in the horizontal direction and a height in the vertical direction. The width being greater than the height, for example the width being more than 25% greater than the height, such as 40%, 50%, 75% or 100%.

Figure 9C:
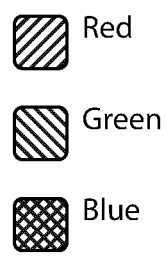
FIG. 9c shows a perspective of three image pixels.
Figure 9C:
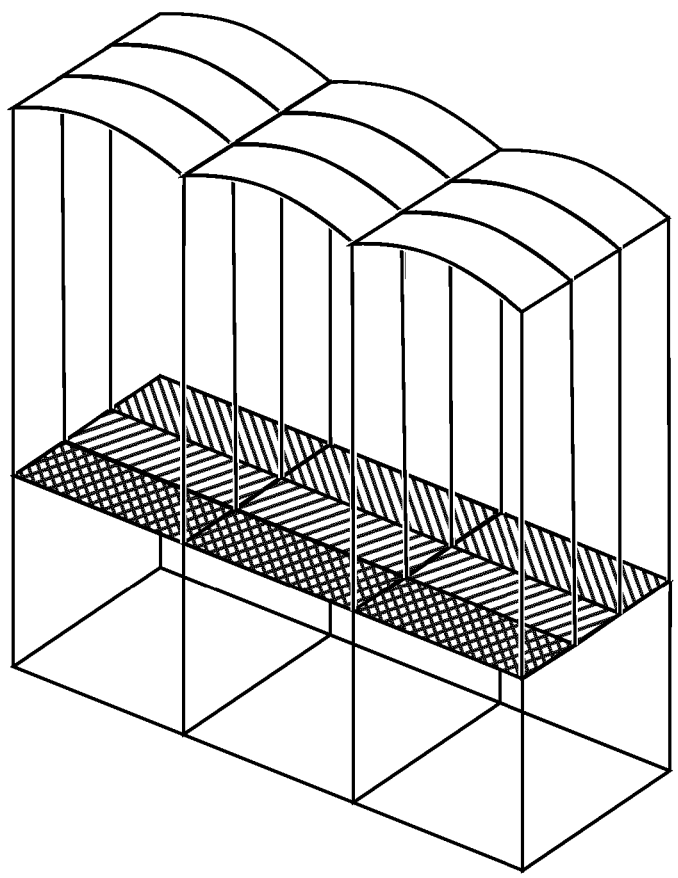

FIG. 9c shows a perspective of three image pixels.

Each of the three image pixels has three RGB subpixels, a color filter in front of each RGB subpixel.

In front of each RGB subpixel is arranged an optical arrangement illustrated as an elongated optical lens. The optical lens is elongated in the horizontal direction, i.e. has a width (measured horizontally) that is greater than the height (measured vertically for the intended operational position of the display, i.e. hanging on a wall or standing on a stand).

Thus, the shape of the optical arrangement in front of a RGB subpixel follows the shape of the color filter in front of a RGB subpixel.

Now follows a set of points, which constitute aspects of the present invention which may be considered independently patentable and as such the following sets form basis for possible future sets of claims:

1. A display for displaying an image to an observer at a first viewpoint, said display comprising:
   a plurality of pixels constituting image pixels, each image pixel comprising a group of subpixels and displaying a sample of said image during intended operation of said display,
   said plurality of pixels arranged in a plane,
   an electric circuit including a plurality of pixel circuits, each pixel circuit arranged for driving said group of subpixels of each image pixel,
   a front optical arrangement, said front optical arrangement having at least one optical element with an optical power and a first focal point substantially at said plane, and a second focal point between said front optical arrangement and a point in front of and infinitely far away from said front optical arrangement.

2. A display for displaying an image to an observer at a first viewpoint, said display comprising:
   a plurality of pixels constituting image pixels, each image pixel comprising a group of subpixels and displaying a sample of said image during intended operation of said display,
   an electric circuit including a plurality of pixel circuits, each pixel circuit arranged for driving said plurality of subpixels of each image pixel,
   said plurality of pixel circuits including:
   a first pixel circuit having a first pixel driver for driving a first group of subpixels including a first subpixel, and
   a second pixel circuit with a second pixel driver for driving a second group of subpixels including a second subpixel,
   said first subpixel connected through a first switch to said first pixel driver for driving said first subpixel such that said first subpixel outputting light having a first brightness, and
   said second subpixel connected through a second switch to said second pixel driver for driving said second subpixel such that said second subpixel outputting light having a second brightness,
   said first switch having a first input for switching said first switch, and said second switch having a second input for switching said second switch, said electric circuit comprising a control circuit for switching said first switch and said second switch by means of a control signal output by said control circuit at an output,
said output connected to said first input and said second input.

3. A display for displaying an image to an observer at a first viewpoint, said display comprising:
a plurality of pixels constituting image pixels, each image pixel comprising a group of subpixels and displaying a sample of said image during intended operation of said display,
each group of subpixels having a first number of subpixels positioned substantially horizontally such as a row of subpixels, and a second number of subpixels positioned substantially vertically such as a column of subpixels,
an electric circuit including a plurality of pixel circuits, each pixel circuit arranged for driving said group of subpixels of each image pixel,
a control system for outputting address signals for addressing a respective subpixel of each pixel circuit, and a set of brightness values, said set of brightness values comprising a brightness value for each pixel circuit,
said electric circuit connected to said control system by means of a number of electrode lines,
said number of electrode lines being smaller than the sum of said first number of subpixels and said second number of subpixels.

4. A display for displaying an image to an observer at a first viewpoint, said display comprising:
a plurality of pixels constituting image pixels, each image pixel comprising a group of subpixels and displaying a sample of said image during intended operation of said display,
an electric circuit including a plurality of pixel circuits, each pixel circuit arranged for driving said group of subpixels of each image pixel,
said electric circuit comprising a plurality of control circuits for addressing a respective subpixel of said group of subpixels,
each control circuit having a memory component, an address signal input, and a selection input,
said control circuit arranged such that said address signal being input into said memory component when said control circuit being selected by said selection input.

5. The display according to any of the preceding points, each group of subpixels having a first number of subpixels positioned substantially horizontally such as a row of subpixels, and a second number of subpixels positioned substantially vertically such as a column of subpixels.

6. The display according to any of the preceding points, the number of control circuits being equal to the sum of said first number of subpixels and said second number of subpixels.

7. A display for displaying a color image, said display comprising:
a plurality of pixels constituting image pixels, each image pixel comprising a first RGB subpixel, a second RGB subpixel, and a third RGB subpixel,
a color mask arranged in front of said plurality of image pixels,
said color mask constituting a pattern of color filters, including a first color filter arranged in front of said first RGB subpixel,
a second color filter arranged in front of said second RGB subpixel,
a third color filter arranged in front of said third RGB subpixel,
said first color filter arranged for transmitting a first color of the incident light spectrum,
said second color filter arranged for transmitting a second color of the incident light spectrum,
said third color filter arranged for transmitting a third color of the incident light spectrum,
each color filter of said color mask having an elongated shape with a width in the horizontal direction and a height in the vertical direction, said width being greater than said height for reducing diffraction in the horizontal plane compared to the diffraction in the vertical plane.

8. The display according to any of the preceding points, each image pixel comprising a first group of subpixels constituting said first RGB subpixel, a second group of subpixels constituting said second RGB subpixel, and a third group of subpixels constituting said third RGB subpixel.

9. The display according to any of the preceding points, said width being greater than said height such that said display having a higher horizontal resolution of subpixels for a respective color than the vertical resolution of subpixels for said respective color.

10. The display according to any of the preceding points, said plurality of image pixels including a first image pixel, said first image pixel including a first group of subpixels including a first subpixel.

11. The display according to any of the preceding points, said first group of subpixels including a second subpixel.

12. The display according to any of the preceding points, said first subpixel defining a first direction or first angle to said observer viewpoint,
said second subpixel defining a second direction or second angle to said observer viewpoint,
said first angle or direction being more than 0% and less than 10% such as 5% different than said second angle or direction.

13. The display according to any of the preceding points, said plurality of image pixels including a second image pixel, said second image pixel including a second group of subpixels including a third subpixel.

14. The display according to any of the preceding points, said first subpixel and said third subpixel being addressed preferably by a common or the same address control signal such that light being emitted or propagating from said first subpixel and said second subpixel being visible from said observer viewpoint.

15. The display according to any of the preceding points, said third subpixel defining a third direction or second angle to said observer viewpoint.

16. The display according to any of the preceding points, said first angle or direction being substantially the same as said third angle or direction or less than 10% such as 5% different than said third angle or direction.

17. The display according to any of the preceding points, said display comprising a control system for controlling the light intensity and angle or direction of the light being emitted or propagating from said plurality of pixels such that the light being emitted or propagating from said plurality of pixels being visible from said observer viewpoint.

18. The display according to any of the preceding points, said display being an active matrix display.
19. The display according to any of the preceding points, each subpixel constituting a light output element for outputting light.
20. The display according to any of the preceding points, said electric circuit comprising a first line connected to said first input, and a second line connected to said second input.
21. The display according to any of the preceding points, said first line and said second line constituting a node of said electric circuit.
22. The display according to any of the preceding points, said electric circuit comprising a junction, said first line connected to said second line at said junction.
23. The display according to any of the preceding points, said electrode lines including
a number of data lines for transmitting said brightness values,
a number of address lines for transmitting said address signals,
a number of scan lines for scanning said brightness values or said address signals.
24. The display according to any of the preceding points, said number of scan lines demultiplexing said brightness values.
25. The display according to any of the preceding points, said electric circuit constituting an active matrix backplane.
26. The display according to any of the preceding points, the number of data lines being greater than one.
27. The display according to any of the preceding points, each subpixel of a respective image pixel defining a direction towards a viewpoint such that said image being visible from a first viewpoint when said first subpixel outputting light and said display being perceived as a dark screen from a viewpoint other than said first viewpoint.
% LCD backlight function
28. A display for directional control of an image to an observer, said observer observing said display from an observer viewpoint in front of said display, said display comprising:
a layer of liquid crystals sandwiched between a rear electrode layer and a front electrode layer for generating said image,
a plurality of pixels including a first pixel constituting a backlight pixel,
said plurality of pixels arranged behind said layer,
each pixel defining a pixel area having a plurality of subpixels
said first pixel having a first plurality of subpixels including a first subpixel,
each subpixel pixel defining a direction from said display to a viewpoint,
or an angle between the normal to said display and a viewpoint,
a front optical arrangement, said front optical arrangement having at least one optical element with an optical power and a first focal point substantially at said layer, and a second focal point between said front optical arrangement and a point in front of and infinitely far away from said front optical arrangement,
a control system for controlling the light intensity and angle or direction of the emitted light from said plurality of pixels,
said plurality of pixels being controlled such that each pixel emitting light having substantially the same light intensity for the respective pixels emitting light such that the light intensity emitted by a respective first pixel not being more than 20% different than the light intensity emitted by a respective second pixel.
29. The display according to any of the preceding points, said plurality of pixels arranged in a first segment covering a segment area of said display.
30. The display according to any of the preceding points, said control system being configured such that
the light intensity of said plurality of pixels being individually controlled for each
pixel in said first segment, and
the angle of the emitted light of said plurality of pixels being collectively controlled such that said plurality of pixels emitting light in substantially the same angle such that the light being emitted or propagating from said plurality of pixels being visible from said observer viewpoint.
31. The display according to any of the preceding points, said display comprising an electric circuit comprising said plurality of pixels.
32. The display according to point 31, said electric circuit implemented in a first thin film.
33. The display according to any of the preceding points, said control system being configured for
outputting a set of input brightness values to said electric circuit such that said plurality of pixels in said segment emitting light having a brightness corresponding to the values in said set of input brightness values, and
outputting an address control signal defining the subpixel of each pixel of said plurality of pixels to be addressed such that said plurality of pixels in said segment emitting light in an angle such that said plurality of pixels being visible from said observer viewpoint.
34. The display according to any of the preceding points, said first plurality of subpixels being arranged in a grid having rows and columns such as at least one row and more than one column.
35. The display according to any of the preceding points, comprising an address line for transmitting an address control signal to said electric circuit for addressing a respective subpixel of said first group of subpixels.
36. The display according to point 35, said address line connected to the output of an active matrix column driver.
37. The display according to point 35 or 36, said address line constituting an electrode line.
38. The display according to any of points 35-37, said address line implemented in said first thin film or a second thin film different from said first thin film.
39. The display according to any of points 35-38, said address control signal comprising a row control signal and a column control signal.
40. The display according to any of the preceding points, comprising a first subpixel address line for transmitting a subpixel row control signal to said first pixel for addressing a respective subpixel of said first plurality of subpixels.
41. The display according to point 40, said first subpixel address line constituting an electrode line.
42. The display according to point 40 or 41, said first subpixel address line implemented in said first thin film or a second thin film different from said first thin film.
43. The display according to any of the preceding points, comprising a second subpixel address line for transmitting a subpixel column control signal to said first pixel for addressing a respective subpixel of said first plurality of subpixels.
44. The display according to point 43, said second subpixel address line constituting an electrode line.
45. The display according to point 43 or 44, said second subpixel address line implemented in said first thin film or a second thin film different from said first thin film.
46. The display according to any of the preceding points, comprising a data line for transmitting a light intensity value to said first subpixel.
47. The display according to point 46, said data line constituting an electrode line.
48. The display according to point 46 or 47, said data line implemented in said first thin film or a second thin film different from said first thin film.
49. The display according to any of the preceding points, comprising a scan line for drawing said image or updating said image.
50. The display according to point 49, said scan line constituting an electrode line.
51. The display according to point 49 or 50, said scan line implemented in said first thin film or a second thin film different from said first thin film.
52. The display according to any of the preceding points, each subpixel constituting an electroluminescent device such as an LED or OLED or a light modulator such as liquid crystal cell.
53. The display according to any of points 46-48, said first subpixel being connected to said data line through a pixel driver.
54. The display according to point 53, said pixel driver comprising a memory component or circuit such as a sample and hold circuit.
55. The display according to any of points 49-51, said scan line transmitting scan data for controlling said pixel driver.
56. The display according to point 53 or 54, said first subpixel connected to said pixel driver at least through a first row switch such as a transistor.
57. The display according to any of the preceding points 56, said second subpixel connected to said pixel driver at least through said first row switch.
58. The display according to any of points 35-42, said address line or said first subpixel address line transmitting said subpixel row control signal for switching said row switch.
59. The display according to any of points 46-48, said first subpixel connected to said pixel driver at least through a first column switch such as a transistor.
60. The display according to point 59, said second subpixel connected to said pixel driver at least through a second column switch such as a transistor.
61. The display according to any of points 35-39 or 43-45, said address line or said second subpixel address line transmitting said column control signal for switching said column switch.
62. The display according to any of points 35-39, said address line transmitting said address control signal to said first subpixel and said second subpixel such that said first subpixel emitting light and said second subpixel emitting light.
63. The display according to any of points 35-39, said address line connected to each pixel of said plurality of pixels such that said first group of subpixels and said second group of subpixels being switched by means of said address control signal such that said first subpixel and said third subpixel emitting light being visible from said observer viewpoint when being switched on by said address control signal.
64. The display according to any of points 35-39, said address line connected preferably trough a memory component or circuit to said first row switch and said second row switch for switching said first row switch and said second row switch substantially simultaneously.
65. The display according to any of the preceding points, said first row switch and said second row switch connected to the output of said memory component or circuit and said address line connected to the input of said memory component or circuit.
66. The display according to any of the preceding points, said address line connected preferably trough a memory component or circuit to said first column switch and said second column switch for switching said first column switch and said second column switch substantially simultaneously.
67. The display according to any of the preceding points, said first column switch and said second column switch connected to the output of said memory component or circuit and said address line connected to the input of said memory component or circuit.
68. The display according to any of the preceding points, each subpixel having an input for an electric current and an output for said electric current.
69. The display according to any of the preceding points, said first subpixel and second subpixel being connected in parallel.
70. The display according to point 68,
the output of each subpixel in a row of subpixels connected to a memory component or circuit, and
the input of each subpixel in a column of subpixels connected to a second memory component or circuit, or
the output of each subpixel in a column of subpixels connected to a memory component or circuit, and
the input of each subpixel in a row of subpixels connected to a second memory component or circuit, or
the input of each subpixel in a column of subpixels connected to a memory component or circuit, and
the output of each subpixel in a row of subpixels connected to a second memory component or circuit, or
the input of each subpixel in a row of subpixels connected to a memory component or circuit, and
the output of each subpixel in a column of subpixels connected to a second memory component or circuit.
71. The display according to any of the preceding points, said memory component or circuit being a sample and hold circuit, a data latch or a flip flop.
72. The display according to any of the preceding points, said control system being configured such that more than one subpixel being addressed for emitting light for each image frame for a uniform light intensity from said first pixel from one image frame to another.
73. The display according to any of the preceding points, the number of subpixels of said first group of subpixels being addressed for emitting light from one image frame to another image frame not differing by more than 25% such that the current through a respective subpixel not deviating by more than 25% from one image frame to another image frame.
74. The display according to any of the preceding points, the number of subpixels of said first group of subpixels being addressed for emitting light from one image frame to another image frame being constant.

75. The display according to any of the preceding points, said first group of subpixels comprising a dummy subpixel.
76. The display according to point 75, said dummy subpixel being addressed for emitting light together with said first subpixel, and said dummy subpixel positioned within said first pixel such that the light emitted by said third subpixel not being visible from said observer viewpoint.
77. The display according to point 75-76, said second subpixel being switched on together with said first subpixel, and said second subpixel positioned proximate said first subpixel such that the light emitted by said second subpixel being visible from said observer viewpoint.
78. The display according to any of the preceding points, the angle of the emitted light of said plurality of pixels being collectively controlled by controlling each pixel by an address control signal defining the angle of the emitted light of said plurality of pixels such that said first pixel receiving said address control signal, and said second pixel receiving said address control signal.
79. The display according to any of the preceding points, the angle of emitted light from said first subpixel and the angle of emitted light from said second subpixel not deviating from each other by more than 25% such as not more than 1 degrees or 0.5 degrees.
80. The display according to any of the preceding points, said first subpixel arranged at a first position within the area of said first pixel, and said third subpixel arranged at a second position within the area of said second pixel,
said second position constituting substantially a translation of said first position such that
the light emitted by said first subpixel and said second subpixel being visible from said viewpoint, or
said first subpixel having substantially the same position within the pixel area of said first pixel as said third subpixel has within the pixel area of said second pixel such that the light emitted by said first subpixel and said third subpixel being visible from said viewpoint.
81. The display according to any of the preceding points, the angle of light being emitted by a respective pixel being controlled by means of said control system by optically or electronically addressing subpixels.
82. The display according to any of the preceding points, said display configured such that when said observer observing said display from said viewpoint
said control system sending an address control signal to said first subpixel and said second subpixel such that said first subpixel and said second subpixel emitting light in the angle of said viewpoint.
83. The display according to any of the preceding points, said segment area having a width smaller than 10 cm and greater than 0.5 cm.
84. The display according to any of the preceding points, said first segment having more than two pixels such as 10 or 20 or 50 pixels.
85. The display according to any of the preceding points, said first segment having less than 50000 pixels.
86. A display for directional control of an image to an observer, said observer observing said display from an observer viewpoint in front of said display, said display comprising:
a plurality of pixels including a first pixel constituting an image pixel,
said plurality of pixels arranged in a plane,
each pixel defining a pixel area having a plurality of subpixels,
said first pixel having a first plurality of subpixels including a first subpixel,
each subpixel pixel defining a direction from said display to a viewpoint,
or an angle between the normal to said display and a viewpoint,
each subpixel being optically addressable and comprising:
a thin film stack of an electroluminescent layer and a photo sensitive layer,
said electroluminescent layer and said photo sensitive layer constituting an optical converter such that light incident on a respective subpixel leads to generation of a first current through said photo sensitive layer and through said electroluminescent layer such that said electroluminescent layer emits light from the position of said respective subpixel within said pixel when a voltage being applied across said thin film stack,
a front optical arrangement, said front optical arrangement having at least one optical element with an optical power and a first focal point substantially at said plane, and a second focal point between said front optical arrangement and a point in front of and infinitely far away from said front optical arrangement,
a control system for controlling the light intensity and angle or direction of the emitted light from said plurality of pixels such that the light emitted by said plurality of pixels being visible from said observer viewpoint.
87. The display according to any of the preceding points, comprising:
an addressing light element having a plurality of addressing pixels for emitting light from a respective addressing pixel to said segment and optically addressing the subpixels of said segment,
each addressing pixel defining a direction from said segment towards a viewpoint.
88. The display according to any of the preceding points, comprising:
an optical arrangement between said addressing light element and said optical converter, said optical arrangement having at least one optical element with an optical power,
said optical arrangement adapted for directing the light from said respective addressing pixel to the subpixels of said segment such that the subpixels of said segment emits light visible from said viewpoint.
89. The display according to any of the preceding points, the light from said plurality of addressing pixels being modulated such that said thin film stack being illuminated with a first intensity in a first pattern defining the optical paths between said thin film stack and a first eye of an observer and such that said thin film stack being illuminated with a second intensity in areas outside of said first pattern, where said second intensity is lower than said first intensity
90. The display according to any of the preceding points, the light from said plurality of light emitters or addressing pixels being modulated such that said thin film stack being illuminated in a first time interval in a first pattern defining the optical paths between said thin film stack and a first eye of said first observer and said thin film stack being illuminated in a second time interval in a second pattern defining the optical paths between said thin film stack and a second eye of said second observer, such that in said first time interval said first image for said first eye of said first observer being emitted, and in said second time interval said second image for said second eye of said second observer being emitted.

91. The display according to any of the preceding points, comprising:

an electric circuit for generating a current through said electroluminescent layer, the current density of said current through said electroluminescent layer having an amplitude varying with a maximum of 20% with respect to the average amplitude of the current density, 92. The display according to any of the preceding points, said optical converter having a front side towards said observer, and a backside opposite said front side.

93. The display according to any of the preceding points, said electroluminescent layer constituting an organic light-emitting diode or organic light emitter.

94. The display according to any of the preceding points, said optical arrangement and said addressing light element arranged behind said optical converter relative to said viewpoint.

95. The display according to any of the preceding points, said optical arrangement and said addressing light element arranged in front of said optical converter relative to said viewpoint.

96. The display according to any of the preceding points, a respective first addressing pixel defining a first direction from said first segment towards said viewpoint, and a respective second addressing pixel defining a second direction from said first segment towards a second viewpoint, said first direction being different from said second direction.

97. The display according to any of the preceding points, comprising a second plurality of pixels arranged in a second segment covering an area of said display for emitting light visible from said viewpoint.

98. The display according to any of the preceding points, said second segment arranged next to said first segment.

99. The display according to any of the preceding points, said second segment having a view angle from said viewpoint to said second segment different than the view angle from said viewpoint to said first segment.

100. The display according to any of the preceding points, comprising a second addressing light element having a second plurality of addressing pixels for emitting light from a respective addressing pixel to said second segment and optically addressing the subpixels of said second segment.

101. The display according to any of the preceding points, said optical arrangement comprising a plurality of optical elements.

102. The display according to any of the preceding points, the number of optical elements corresponding to the number of pixels.

103. The display according to any of the preceding points, a respective optical element adapted to compensate for an off-axis position of said optical element relative to a center axis of the addressing light element.

104. The display according to any of the preceding points, a respective optical element having a prismatic property and/or being tilted relative to a plane of the addressing light element.

105. The display according to any of the preceding points, comprising a compensating optical arrangement located in the optical path between a respective optical element and the addressing light element, said compensating optical element being adapted to compensate for an off-axis position of said optical arrangement relative to a center axis of the addressing light element.

106. The display according to any of the preceding points, said compensating optical arrangement located in the optical paths between more than one optical element comprised of said optical arrangement and the addressing light element.

107. The display according to any of the preceding points, said compensating optical arrangement being a collimating lens.

108. The display according to any of the preceding points, comprising a second optical arrangement between said addressing light element and said optical converter, said second optical arrangement having an optical power, said second optical arrangement adapted for directing the light from a respective addressing pixel of said second plurality of addressing pixels to the subpixels of said second segment such that the subpixels of said segment emits light visible from said viewpoint.

109. The display according to any of the preceding points, comprising a layer of addressing light element having a plurality of addressing pixels.

110. The display according to any of the preceding points, a respective optical element being a converging lens or a diffractive optical element.

111. The display according to any of the preceding points, said addressing pixel being projected onto a surrounding area of an eye of the observer and reflected towards said optical arrangement.

112. The display according to any of the preceding points, comprising a plurality of segments for emitting light visible from said viewpoint.

113. The display according to any of the preceding points, comprising a second controller for addressing the pixels of said plurality of segments such that a voltage being applied to the pixels of said plurality of segments constituting said image.

114. The display according to any of the preceding points, said second controller being synchronized with the first controller such that said addressing light element being addressed while the pixels being addressed.

115. The display according to any of the preceding points, comprising:

a stack of at least a first set of first thin films, a second set of thin films and a third set of thin films, said first set of thin films defining an electroluminescent layer including said plurality of pixels, said second set of thin films defining a photo sensitive layer, said electroluminescent layer and said photo sensitive layer constituting an optical converter such that light incident on a respective subpixel leads to generation of a first current through said photo sensitive layer and through said electroluminescent layer such that said electroluminescent layer emits light from the position of said respective subpixel within said pixel when a voltage being applied across said thin film stack, said third set of thin films definig an addressing light layer including an addressing array for each pixel for emitting light from a respective addressing pixel and optically addressing the subpixels of a respective pixel, said control system configured for addressing a respective addressing pixel for each addressing array such that the light from said respective addressing pixel being directed to a respective subpixel for a respective pixel such that said image being visible from said viewpoint.

116. A display for directional control of an image to an observer, said observer observing said display from an observer viewpoint in front of said display, said display comprising:
a plurality of pixels including a first pixel constituting an image pixel,
said plurality of pixels arranged in a plane,
each pixel defining a pixel area having a plurality of subpixels,
said first pixel having a first plurality of subpixels including a first subpixel,
each subpixel pixel defining a direction from said display to a viewpoint,
or an angle between the normal to said display and a viewpoint,
a front optical arrangement, said front optical arrangement having at least one optical element with an optical power and a first focal point substantially at said plane, and a second focal point between said front optical arrangement and a point in front of and infinitely far away from said front optical arrangement,
a stack of at least a first set of first thin films, a second set of thin films and a third set of thin films,
said first set of thin films defining an electroluminescent layer having a plurality of pixels including a first pixel constituting an image pixel,
each pixel defining a pixel area having a plurality of subpixels,
said first pixel having a first plurality of subpixels including a first subpixel,
each subpixel being optically addressable,
said second set of thin films defining a photo sensitive layer,
said electroluminescent layer and said photo sensitive layer constituting an optical converter such that light incident on a respective subpixel leads to generation of a first current through said photo sensitive layer and through said electroluminescent layer such that said electroluminescent layer emits light from the position of said respective subpixel within said pixel when a voltage being applied across said thin film stack,
said third set of thin films defining an addressing light layer including an addressing array for each pixel for emitting light from a respective addressing pixel and optically addressing a respective subpixel of a respective pixel for such that said respective subpixel emitting light,
each addressing pixel defining an angle from a respective pixel towards a viewpoint,
a controller for addressing a respective addressing pixel for each addressing array such that the light from said respective addressing pixel being directed to a respective subpixel for a respective pixel such that said image being visible from said viewpoint.

117. A display for directional control of an image to an observer, said display comprising:
a plurality of pixels, each image pixel defining an area having a plurality of subpixels,
each subpixel being optically addressable and comprising:
a thin film stack of an electroluminescent layer and a photo sensitive layer,
said electroluminescent layer and said photo sensitive layer constituting an optical converter such that light incident on a respective subpixel leads to generation of a current through said photo sensitive layer and through said electroluminescent layer such that said electroluminescent layer emits light from the position of said respective subpixel within said image pixel when a voltage being applied across said thin film stack,
said display comprising:
a front optical arrangement, said front optical arrangement having at least one optical element with an optical power and a first focal point substantially at said plane, and a second focal point between said front optical arrangement and a point in front of and infinitely far away from said front optical arrangement,
an addressing light element having a plurality of addressing arrays, each addressing array having a plurality of addressing pixels for emitting light to said optical converter,
said plurality of addressing arrays being arranged such that each image pixel being addressed by an addressing array,
each addressing pixel in a respective addressing array for a respective image pixel defining a direction from said respective image pixel towards a viewpoint,
a controller for addressing a respective addressing pixel for each addressing array such that the light from said respective addressing pixel being directed to a respective subpixel for each image pixel such that said image being visible from said viewpoint.

118. The display according to any of the preceding points, said controller being
remote from said display.

119. The display according to any of the preceding points, said controller being adapted such that the light from said addressing pixels being modulated such that said optical converter being illuminated in a first time interval in a first pattern defining the optical paths between said segment and the left eye of said observer and in a second time interval in a second pattern defining the optical paths between said segment and the right eye of said observer for displaying said image in 3D.

120. The display according to any of the preceding points, said optical converter having a front side towards said observer, and a backside opposite said front side.

121. The display according to any of the preceding points, said addressing light element arranged behind said optical converter relative to said viewpoint.

122. The display according to any of the preceding points, said addressing light element arranged in front of said optical converter relative to said viewpoint.

123. The display according to any of the preceding points, said second focal point located substantially at infinity.

124. The display according to any of the preceding points, said front optical arrangement arranged in front of said optical converter relative to said viewpoint.

125. The display according to any of the preceding points, said first focal point being in a plane within a distance of +/−2 cm such as +/−100 micro meter (um) to said optical converter.

126. The display according to any of the preceding points, comprising a tracking system for tracking or detecting the position of said observer.

127. The display according to any of the preceding points, said tracking system constituting an eye tracking system for tracking or detecting a position of an eye of said observer.

128. The display according to any of the preceding points, said tracking system comprising a visible or infrared camera or an illumination system capable of illuminating said observer with structured or unstructured illumination or a lidar and/or a passive infrared detector.

129. The display according to any of the preceding points, said controller adapted for addressing a respective addressing pixel as a function of the position of said observer.

130. The display according to any of the preceding points, said thin film stack including a pair of terminals, one on each side of said stack for applying said voltage across said thin film stack.

131. The display according to any of the preceding points, a respective terminal having an area corresponding to the area of an image pixel.

132. An active matrix display for directional control of an image to an observer, said observer observing said display from an observer viewpoint in front of said display, said display comprising:
a plurality of pixels including a first pixel constituting an image pixel, said plurality of pixels arranged in a plane, each pixel defining a pixel area having a first plurality of subpixels including a first subpixel, each subpixel pixel defining a direction from said display to a viewpoint, or an angle between the normal to said display and a viewpoint,
a front optical arrangement, said front optical arrangement comprising a plurality of optical elements where at least one optical element having an optical power and a first focal point substantially at said plane, and a second focal point between said front optical element and a point in front of and infinitely far away from said front optical element,
a control system for controlling the light intensity and angle or direction of the emitted light from said plurality of pixels such that the light emitted by said plurality of pixels being visible from said observer viewpoint.
a thin film circuit comprising the plurality of pixels and capable of receiving as inputs a plurality of scan lines (row lines) and a plurality of data lines (column lines) where the thin film circuit is capable of receiving on a first set of data line(s) in the plurality of data lines a set of grayscale signal(s) and of receiving on a second set of data line(s) in the plurality of data lines a sub-pixel addressing signal and where the thin film circuit is capable of illuminating a plurality of sub-pixels in positions according to the received sub-pixel addressing signal and of illuminating sub-pixels with light intensities according to corresponding grayscale signals in the received set of grayscale signals.

133. The display according to any of the preceding points, the received addressing signal comprises a one-hot encoded or a multi-hot encoded binary signal for indicating sub-pixel row(s) or sub-pixel column(s).

134. The display according to any of the preceding points, the binary signal is encoded by analog voltages being either below a first voltage threshold or above a second voltage threshold.

135. The display according to any of the preceding points, the first voltage threshold is 20% of a maximum voltage and the second voltage threshold is 80% of a maximum voltage.

136. The display according to any of the preceding points, the plurality of data lines (column lines) are connected to an active matrix column driver (source driver/data driver).

137. A monoscopic display for displaying a picture and for reducing power consumption while displaying said picture to an observer, said monoscopic display comprising:
a plurality of image pixels arranged in a grid, each image pixel defining an area for emitting light from a part of said area, and
each image pixel comprising:
a thin film stack of an electroluminescent layer and a photo sensitive/diode layer, said electroluminescent layer and said photo sensitive/diode layer constituting an optical converter,
said monoscopic display comprising:
a plurality of addressing pixels including a first addressing pixel and a second address-ing pixel for illuminating said thin film stack,
a controller for addressing said first addressing pixel and said second addressing pixel
for emitting light from said first addressing pixel and said second addressing pixel,
said first addressing pixel defining a first direction from a respective image pixel to-wards said observer,
said second addressing pixel defining a second direction from a respective image pixel, said first direction being different than said second direction,
the light from said first addressing pixel having a higher intensity than the light from said second addressing pixel.

The invention claimed is:
1. A display for displaying an image to an observer at a first viewpoint, the display comprising:
a plurality of pixels constituting image pixels, each image pixel comprising a group of subpixels and displaying a sample of the image during intended operation of the display;
each group of subpixels having a first number of subpixels positioned substantially horizontally such as a row of subpixels, and a second number of subpixels positioned substantially vertically such as a column of subpixels;
an electric circuit including a plurality of pixel circuits, each pixel circuit arranged for driving the group of subpixels of each image pixel;
a control system for outputting address signals for addressing a respective subpixel of each pixel circuit, and a set of brightness values, the set of brightness values comprising a brightness value for each pixel circuit;
the electric circuit connected to the control system by means of a number of electrode lines; and
the number of electrode lines being smaller than a sum of the first number of subpixels and the second number of subpixels.

2. The display according to claim 1, wherein each group of subpixels has a first number of subpixels positioned substantially horizontally such as a row of subpixels, and a second number of subpixels positioned substantially vertically such as a column of subpixels.

3. The display according to claim 1, wherein the number of control circuits are equal to the sum of the first number of subpixels and the second number of subpixels.

4. The display according to claim 1, wherein the plurality of image pixels includes a first image pixel, the first image pixel including a first group of subpixels including a first subpixel.

5. The display according to claim 4, wherein the first group of subpixels includes a second subpixel.

6. The display according to claim 5, wherein:
the first subpixel defines a first direction or first angle to an observer viewpoint;
the second subpixel defines a second direction or second angle to the observer viewpoint; and
the first angle or direction is more than 0% and less than 10% such as 5% different than the second angle or direction.

7. The display according to claim 6, wherein the plurality of image pixels includes a second image pixel, the second image pixel including a second group of subpixels including a third subpixel.

8. The display according to claim 7, wherein the first subpixel and the third subpixel are addressed preferably by a common or the same address control signal such that light being emitted or propagating from the first subpixel and the second subpixel are visible from an observer viewpoint.

9. The display according to claim 7, wherein the third subpixel defines a third angle or direction to an observer viewpoint.

10. The display according to claim 9, wherein the first angle or direction is substantially the same as the third angle or direction or less than 10% such as 5% different than the third angle or direction.

11. The display according to claim 1, wherein the display further comprises a control system for controlling a light intensity and angle or direction of light being emitted or propagating from the plurality of pixels such that the light being emitted or propagating from the plurality of pixels being visible from an observer viewpoint.

12. The display according to claim 1, wherein the electrode lines includes:
a number of data lines for transmitting the brightness values;
a number of address lines for transmitting the address signals; and
a number of scan lines for scanning the brightness values or the address signals.

13. The display according to claim 12, wherein the number of scan lines demultiplexes the brightness values.

14. A display for displaying an image to an observer at a first viewpoint, the display comprising:
a plurality of pixels constituting image pixels, each image pixel comprising a group of subpixels and displaying a sample of the image during intended operation of the display;
an electric circuit including a plurality of pixel circuits, each pixel circuit arranged for driving the group of subpixels of each image pixel;
the plurality of pixel circuits including:
a first pixel circuit having a first pixel driver for driving a first group of subpixels including a first subpixel; and
a second pixel circuit with a second pixel driver for driving a second group of subpixels including a second subpixel;
the first subpixel connected through a first switch to the first pixel driver for driving the first subpixel such that the first subpixel outputting light having a first brightness; and
the second subpixel connected through a second switch to the second pixel driver for driving the second subpixel such that the second subpixel outputting light having a second brightness;
the first switch having a first input for switching the first switch, and the second switch having a second input for switching the second switch,
the electric circuit comprising a control circuit for switching the first switch and the second switch by means of a control signal output by the control circuit at an output; and
the output connected to the first input and the second input.

15. A display for displaying an image to an observer at a first viewpoint, the display comprising:
a plurality of pixels constituting image pixels, each image pixel comprising a group of subpixels and displaying a sample of the image during intended operation of the display;
an electric circuit including a plurality of pixel circuits, each pixel circuit arranged for driving the group of subpixels of each image pixel;
the electric circuit comprising a plurality of control circuits for addressing a respective subpixel of the group of subpixels;
each control circuit having a memory component, an address signal input, and a selection input; and
the control circuit arranged such that the address signal being input into the memory component when the control circuit being selected by the selection input.

* * * * *